US012292574B2

(12) United States Patent
Noguchi et al.

(10) Patent No.: US 12,292,574 B2
(45) Date of Patent: May 6, 2025

(54) OPTICAL MODULE, VIRTUAL IMAGE DISPLAY DEVICE, AND LIGHT-GUIDING DEVICE

(71) Applicant: SEIKO EPSON CORPORATION, Tokyo (JP)

(72) Inventors: Toshiyuki Noguchi, Shiojiri (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 453 days.

(21) Appl. No.: 17/512,092

(22) Filed: Oct. 27, 2021

(65) Prior Publication Data

US 2022/0128826 A1 Apr. 28, 2022

(30) Foreign Application Priority Data

Oct. 28, 2020 (JP) .................................. 2020-180745

(51) Int. Cl.
*G02B 27/01* (2006.01)
(52) U.S. Cl.
CPC ..... *G02B 27/0176* (2013.01); *G02B 27/0172* (2013.01); *G02B 2027/011* (2013.01); *G02B 2027/0161* (2013.01); *G02B 2027/0178* (2013.01)
(58) Field of Classification Search
CPC ............ G02B 27/0176; G02B 27/0172; G02B 2027/011; G02B 2027/0161; G02B 2027/0178; G02B 5/04; G02B 17/0816

USPC ......................................................... 359/630
See application file for complete search history.

(56) References Cited

U.S. PATENT DOCUMENTS

| 5,835,279 A | * | 11/1998 | Marshall | G02B 25/001 |
| | | | | 359/716 |
| 2003/0184868 A1 | * | 10/2003 | Geist | G02B 27/0176 |
| | | | | 351/63 |
| 2006/0210235 A1 | * | 9/2006 | Shen | G02B 5/04 |
| | | | | 385/147 |
| 2018/0284388 A1 | * | 10/2018 | Lee | G02B 27/286 |
| 2020/0033606 A1 | * | 1/2020 | Takeda | G02B 17/082 |
| 2023/0034002 A1 | * | 2/2023 | Jing | G02B 7/022 |

FOREIGN PATENT DOCUMENTS

| JP | H11-296095 A | | 10/1999 | |
| JP | 2017-211674 A | | 11/2017 | |
| KR | 20070024280 A | * | 3/2007 | ............... G02B 5/04 |

* cited by examiner

*Primary Examiner* — Marin Pichler
*Assistant Examiner* — Mackenzi Waddell
(74) *Attorney, Agent, or Firm* — Oliff PLC

(57) ABSTRACT

An optical module according to the present disclosure includes a display element, a first optical member, a second optical member, a third optical member, and an adhesive joints the first optical member and the second optical member. A first optical member includes a first positioning portion that performs a positioning with respect to a second optical member and the second optical member includes a second positioning portion that performs a positioning with respect to the first optical member.

11 Claims, 11 Drawing Sheets

OPTICAL MODULE, VIRTUAL IMAGE DISPLAY DEVICE, AND LIGHT-GUIDING DEVICE

The present application is based on, and claims priority from JP Application Serial Number 2020-180745, filed Oct. 28, 2020, the disclosure of which is hereby incorporated by reference herein in its entirety.

BACKGROUND

1. Technical Field

The present disclosure relates to an optical module, a virtual image display device.

2. Related Art

A virtual image display device capable of making a virtual image observable by guiding imaging light emitted from a display element to an observer's pupil by means of an optical element such as a projection lens is traditionally known. JP-A-2017-211674 discloses a virtual image display device including a display element, a display element case that houses and supports the display element, a projection optical system configured to project light from the display element, a lens barrel that houses and supports the projection optical system and is connected to the display element case, and a light-guiding device configured to direct light from the projection optical system toward an eye of an observer for visual recognition of an image.

JP-A-2017-211674 discloses performing positioning of the display element with respect to the projection optical system by using positioning portions constituted by a convex portion provided on one member of the display element and the lens barrel, and a concave portion provided on the other member. In this manner, in traditional virtual image display devices, when performing positioning between optical members, a supporting member such as a lens barrel that supports an optical member was necessary. For virtual image display devices, an application in which a virtual image display device is worn on the body of an observer like a head-mounted display, for example, is contemplated, and thus reduction in size and weight may be required. However, traditional virtual image display devices need to include a support member having an above-described positioning portion, which may make it difficult to reduce the size and weight of virtual image display devices.

In addition, in virtual image display devices, distortion may be generated in the virtual image observed by the observer due to a plurality of optical members constituting the projection optical system. This type of distortion can be corrected by forcibly imparting distortion that is configured to cancel the distortion generated in the optical member with respect to the image displayed on the display element, for example. However, when assembly errors and the like during manufacturing cause a variation in positioning between optical members, it is difficult to appropriately correct distortion, and display quality may deteriorate.

SUMMARY

In order to solve the above-described problems, an optical module according to an aspect of the present disclosure includes: a display element configured to emit imaging light, a first optical member on which the imaging light emitted from the display element is incident, a second optical member on which the imaging light emitted from the first optical member is incident, a third optical member on which the imaging light emitted from the second optical member is incident, the third optical member forming an exit pupil, and an adhesive joints the first optical member and the second optical member, wherein the first optical member includes a first positioning portion that performs a positioning with respect to a second optical member, the second optical member includes a second positioning portion that performs a positioning with respect to the first optical member.

In addition, a virtual image display device according to an aspect of the present disclosure includes an optical module according to an aspect of the present disclosure.

In addition, a light-guiding device according to an aspect of the present disclosure includes: a first optical member on which imaging light is incident, a second optical member on which the imaging light emitted from the first optical member is incident, and a third optical member on which the imaging light emitted from the second optical member is incident, the third optical member forming an exit pupil, wherein a first positioning member constituted by one optical member of at least two optical members among the first optical member, the second optical member, and the third optical member includes a first positioning portion configured to perform positioning with respect to a second positioning member constituted by the other optical member of the at least two optical members, the second positioning member includes a second positioning portion configured to perform positioning with respect to the first positioning member, and in a state in which positioning between the first positioning member and the second positioning member is accomplished by the first positioning portion and the second positioning portion coming into contact with each other, the first positioning member and the second positioning member are joined to each other through an adhesive layer.

In addition, a method of manufacturing an optical module according to an aspect of the present disclosure is a method of manufacturing an optical module, the optical module including a display element configured to emit imaging light, a first optical member on which the imaging light emitted from the display element is incident, a second optical member on which the imaging light emitted from the first optical member is incident, and a third optical member on which the imaging light emitted from the second optical member is incident, the third optical member forming an exit pupil, wherein a first positioning member that is one optical member of at least two optical members among the first optical member, the second optical member, and the third optical member includes a first positioning portion configured to perform positioning with respect to a second positioning member that is the other optical member of the at least two optical members, and the second positioning member includes a second positioning portion configured to perform positioning with respect to the first positioning member, the method including: bringing the first positioning portion and the second positioning portion into contact with each other to perform positioning between the first positioning member and the second positioning member, and in a state in which the positioning is performed, joining the first positioning member and the second positioning member to each other through an adhesive layer.

DESCRIPTION OF EXEMPLARY EMBODIMENTS

First Embodiment

A first embodiment of the present disclosure will be described below using FIGS. 1 to 10.

Figure 1:
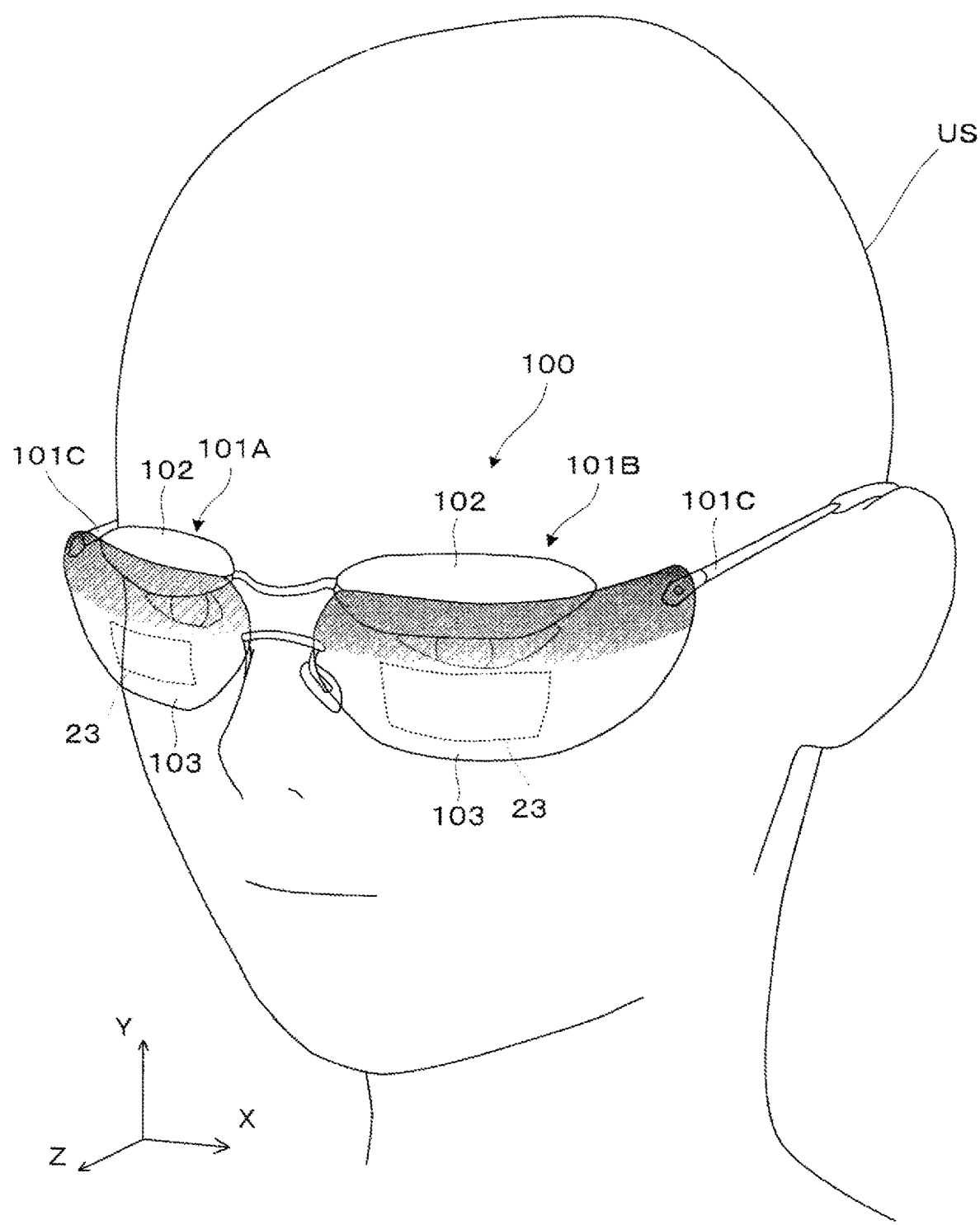
FIG. 1 is an external appearance perspective view illustrating a wearing state of a virtual image display device according to a first embodiment.
Figure 2:
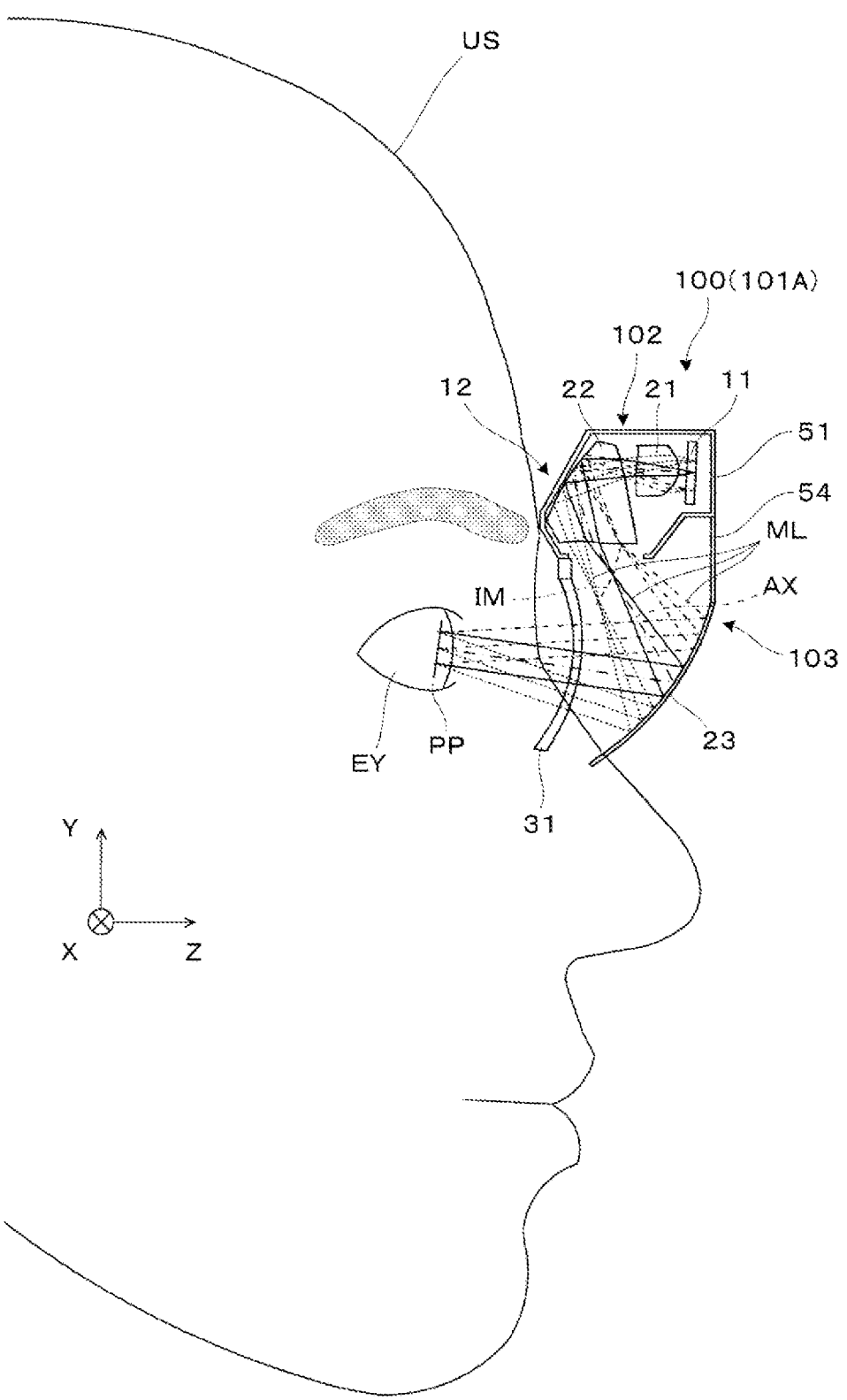
FIG. 2 is a longitudinal cutaway view of a virtual image display device.
Figure 3:
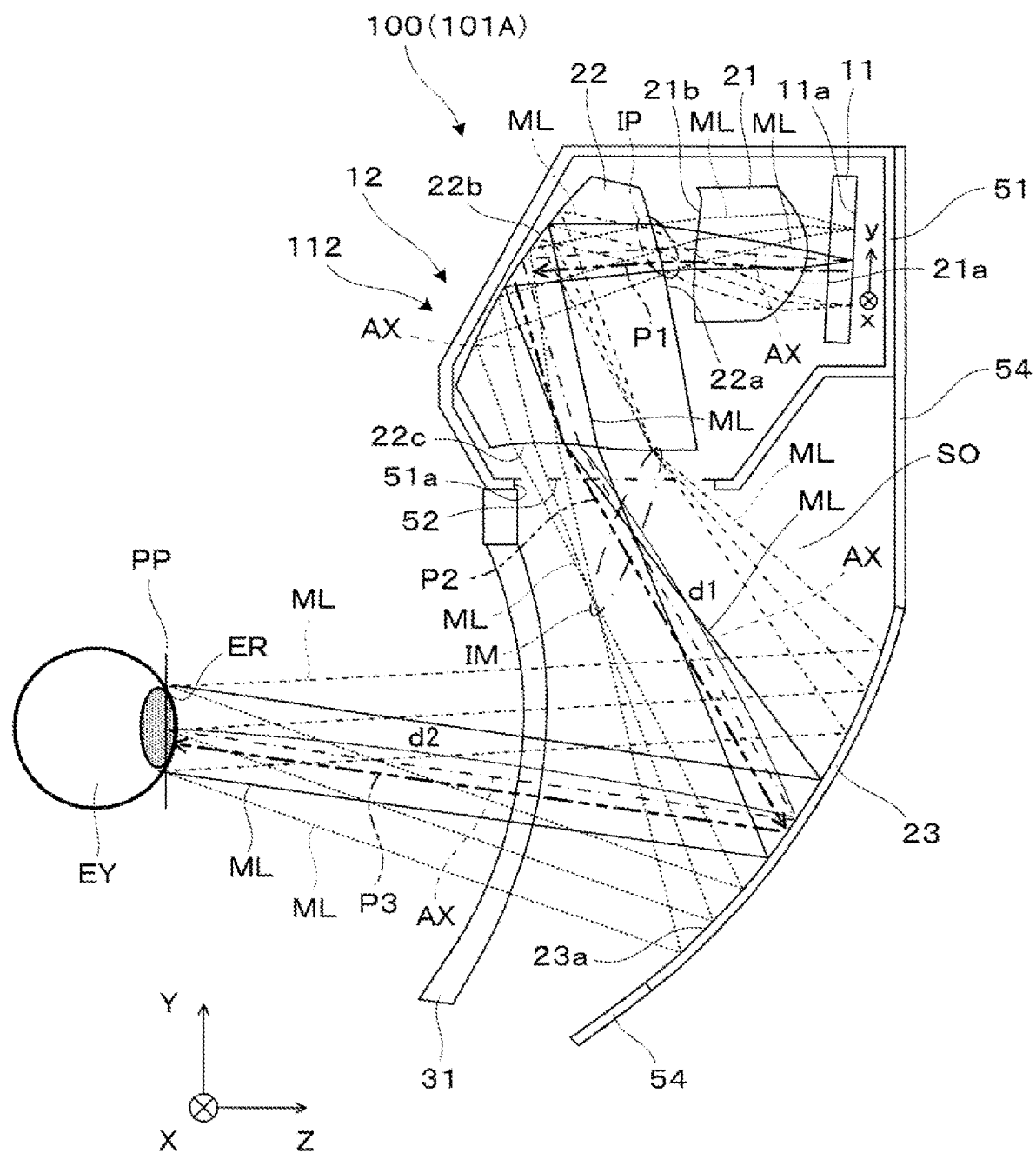
FIG. 3 is a longitudinal cutaway view illustrating an internal structure of a virtual image display device.

FIG. 1 is an external appearance perspective view illustrating a wearing state of a virtual image display device according to the present embodiment. FIG. 2 is a longitudinal cutaway view of a virtual image display device. FIG. 3 is a longitudinal cutaway view illustrating an internal structure of a virtual image display device.

Note that, in the drawings, the dimensions of some components may be scaled differently for ease of understanding for the components.

As illustrated in FIGS. 1 and 2, a virtual image display device 100 according to the present embodiment is a head-mounted display (HDM) that has an external appearance like that of a pair of eyeglasses and that is configured to cause the observer or the user US to recognize images that are virtual images.

In FIGS. 1 and 2, X, Y, and Z are orthogonal coordinate systems. The +X direction and the -X direction correspond to the direction in which both eyes of the user US wearing the virtual image display device 100 are aligned, and are defined herein as the lateral direction. The +X direction corresponds to the left direction when viewed from the user US, and the -X direction corresponds to the right direction when viewed from the user US. The +Y direction and the -Y direction correspond to the upward and downward directions orthogonal to the lateral direction in which both eyes of the user US are aligned, where the +Y direction corresponds to the upward direction, and the -Y direction corresponds to the downward direction. The +Z direction and the -Z direction correspond to the forward and backward directions when viewed from the user US, where the +Z direction corresponds to the forward direction, and the -Z direction corresponds to the backward direction.

The virtual image display device 100 includes a first optical module 101A configured to form a virtual image for the right eye, a second optical module 101B configured to form a virtual image for the left eye, and a temple-like support member 101C configured to support the first optical module 101A and the second optical module 101B.

The first optical module 101A includes an optical unit 102 disposed at the upper portion of the first optical module 101A, and an external appearance member 103 having an eyeglass lens-like shape and covering the entire module. Similar to the first optical module 101A, the second optical module 101B includes an optical unit 102 disposed at the upper portion of the second optical module 101B, and an external appearance member 103 having an eyeglass lens-like shape and covering the entire module. The support member 101C supports the first optical module 101A and the second optical module 101B on the upper end side of the external appearance member 103 by means of a member (not illustrated) disposed behind the external appearance member 103.

Since the second optical module 101B has a configuration similar to that of the first optical module 101A, the configuration of the first optical module 101A will be described below. Description of the configuration of the second optical module 101B will be omitted. In addition, in the following description, the first optical module 101A is simply referred to as an optical module 101A.

As illustrated in FIGS. 2 and 3, the optical module 101A includes a display element 11 and a projection optical system 12 as optical elements. The projection optical system 12 may be referred to as a light-guiding device from the viewpoint of guiding imaging light ML from the display element 11 to a pupil position PP. The projection optical system (light-guiding device) 12 includes a projection lens 21, a prism 22, and a see-through mirror 23.

The projection lens 21 of the present embodiment corresponds to the first optical member in the claims. The prism 22 of the present embodiment corresponds to the second optical member in the claims. The see-through mirror 23 of the present embodiment corresponds to the third optical member in the claims.

The display element 11 is constituted by a spontaneous light emitting display device as typified by an organic electroluminescence (EL) element, an inorganic EL element, a light emitting diode (LED) array, an organic LED, a laser array, a quantum dot light emitting element, and the like, for example. The display device 11 forms a still image or a moving image in color on a two-dimensional light emitting surface 11a. The display device 11 is driven by a driving control circuit (not illustrated) to perform display operation.

When an organic EL display or display unit is used as the display device 11, the display device 11 is configured to include an organic EL control unit. When a quantum dot light emitting display is used as the display device 11, the display device 11 is configured to emit green- or red-colored light as a quantum dot film is irradiated with the light of a blue-colored light emitting diode (LED). The display device 11 is not limited to a spontaneous light emitting display element. The display device 11 may be constituted by a liquid crystal display (LCD) or other optical modulation element, with the optical modulation element being illuminated with a light source such as a backlight to form an image. As the display device 11, a liquid crystal on silicon (LCOS; LCOS is a registered trademark), a digital micromirror device, and the like may be used instead of an LCD.

In addition, as the display device 11, instead of an item constituted by a single display element, an item that includes a plurality of display elements and a synthesizing element such as a dichroic prism, and that is configured to synthesize a plurality of lights from the plurality of display elements by the synthesizing element for emission, may be used.

As illustrated in FIG. 3, the projection lens 21 focuses the imaging light ML emitted from the display element 11 into a state close to parallel luminous flux. The projection lens 21 is a single lens in the illustrated example, and includes an incident surface 21a and an emitting surface 21b. The prism 22 includes an incident surface 22a, an inner reflection surface 22b, and an emitting surface 22c. The prism 22 causes the imaging light ML emitted from the projection lens 21 to be incident on the incident surface 22a while being refracted; totally reflected at the inner reflection surface 22b; and emitted from the emitting surface 22c while being refracted. The see-through mirror 23 reflects the imaging light ML emitted from the prism 22 toward the pupil position PP to form an exit pupil. The position at which the exit pupil is formed is referred to as the pupil position PP. On the pupil position PP, imaging lights from the points on the display surface 11a are incident so as to be superimposed one on another in a predetermined diverging state or parallel state from angular directions corresponding to the positions of the points on the display surface 11a. In the projection optical system 12 of the present embodiment, the field of view (FOV) is 44°. The display area of a virtual image by the projection optical system 12 is rectangular, and the 44° described above is an angle in the diagonal direction.

The projection lens 21 and the prism 22 are housed in a case 51 together with the display element 11. The case 51 is formed of a light shielding material, and includes a driving circuit (not illustrated) configured to operate the display element 11. The case 51 includes an aperture 51a. The aperture 51a is sized such that the imaging light ML going from the prism 22 toward the see-through mirror 23 is not interfered with by the case 51. The opening 51a of the case 51 is covered by a protective cover 52 having optical transparency. The protective cover 52 is formed of a material such as a resin that has no optical power and that allows the imaging light ML to pass therethrough without being attenuated. The protective cover 52 is capable of turning the housing space within the case 51 into a sealed state, and enhancing functions such as dust prevention, dew prevention, and prevention of contact with optical surfaces. With respect to the case 51, the see-through mirror 23 is supported via a support plate 54. The case 51 or the support plate 54 is supported by the support member 101C illustrated in FIG. 1, and the support plate 54 and the see-through mirror 23 constitute the external appearance member 103.

The projection optical system 12 is constituted by an off-axis optical system, with the projection lens 21, the prism 22, and the see-through mirror 23 being disposed to form an off-axis system 112. The off-axis optical system referred to herein means that, in the projection lens 21, the prism 22, and the see-through mirror 23 constituting the projection optical system 12, the entire optical path bends before and after incidence of the light beams on at least one reflection surface or refractive surface. In the projection optical system 12, that is, in the off-axis system 112, an optical axis AX is bent such that the optical axis AX extends along an off-axis surface SO that corresponds to the paper surface.

In other words, in the projection optical system 12, the optical axis AX is bent within the off-axis surface SO to cause the projection lens 21, the prism 22, and the see-through mirror 23 to be disposed along the off-axis surface SO. The off-axis surface SO is a surface that generates asymmetry in the off-axis system 112 in multiple stages. The optical axis AX is defined herein as an axis that extends along the optical path of a main light beam emitted from the center of the display element 11 and passes through the center of an eye ring ER or pupil, where the eye ring ER is equivalent to the eye point. In other words, the off-axis surface SO on which the optical axis AX is disposed is parallel to the YZ plane and passes through the center of the display element 11 and the center of the eye ring ER, where the eye ring ER is equivalent to the eye point. The optical axis AX is disposed in a Z shape when viewed in a cross-section. In other words, in the off-axis surface SO, an optical path P1 from the projection lens 21 to the inner reflection surface 22b, an optical path P2 from the inner reflection surface 22b to the see-through mirror 23, and an optical path P3 from the see-through mirror 23 to the pupil position PP are disposed so to be folded back twice in a Z shape.

In the projection optical system 12, the optical path P1 from the projection lens 21 to the inner reflection surface 22b is nearly parallel to the Z direction. In other words, in the optical path P1, the optical axis AX extends substantially parallel to the Z direction or the front direction. The projection lens 21 is disposed in a position in which the projection lens 21 is sandwiched between the prism 22 and the display element 11 in relation to the Z direction or the front direction. In this case, the optical path P1 from the prism 22 to the display element 11 is close to the front direction. The orientation of the optical axis AX in the optical path P1 may be within a range approximately from −30° to +30° on average, where a downward orientation along the Z direction is negative and an upward orientation along the Z direction is positive. Bringing the optical axis AX of the optical path P1 into a downward state toward the Z direction by equal to or greater than −30° makes it possible to avoid the projection lens 21 or the display element 11 from interfering with the see-through mirror 23. In addition, bringing the optical axis AX of the optical path P1 into an upward state toward the Z direction by equal to or less than +30° makes it possible to suppress the projection lens 21 or the display element 11 from protruding upward to become conspicuous in terms of external appearance.

In the optical path P2 from the inner reflection surface 22b to the see-through mirror 23, the optical axis AX may be kept within a range approximately from −70° to −45° on average, where a downward orientation along the Z direction is negative and an upward orientation along the Z direction is positive. Bringing the optical axis AX of the optical path P2 into a downward state toward the Z direction by equal to or greater than −70° makes it possible to secure a space for disposing an inner lens 31 between the see-through mirror 23 and the pupil position PP, and avoid the overall inclination of the see-through mirror 23 from increasing excessively. In addition, bringing the optical axis AX of the optical path P2 into a downward state toward the Z direction by equal to or less than −45° makes it possible to avoid the prism 22 from protruding greatly in the −Z direction or the rearward direction with respect to the see-through mirror 23, and avoid the projection optical system 12 from increasing in thickness.

The optical path P3 from the see-through mirror 23 to the pupil position PP is nearly parallel to the Z direction. In the illustrated example, the optical axis AX is approximately −10°, where a downward orientation along the Z direction is negative. This is because a slightly downcast state in which human line-of-sight is tilted about 10° below the horizontal direction is stable. Note that the central axis HX that is in the horizontal direction with respect to the pupil position PP illustrated in FIG. 4 assumes a case in which the user US wearing the virtual image display device 100 faces the front in a relaxed upright posture and gazes in the horizontal direction or the horizon. While the shapes and posture of the heads of individual users US wearing the virtual image display device 100 including the arrangement of eyes and the arrangement of ears vary, assuming an average head shape or head posture of the user US allows an average central axis HX to be set for the virtual image display device 100 of interest. As a result of the above, in the inner reflection surface 22b of the prism 22, the reflection angle of the light beam along the optical axis AX is approximately from 10° to 60°. In addition, in the see-through mirror 23, the reflection angle of the light beam along the optical axis AX is approximately from 20° to 45°.

In relation to the optical path P2 and the optical path P3 of the main light beam, a distance d1 between the see-through mirror 23 and the prism 22 is set to be equal to or less than a distance d2 between the see-through mirror 23 and the pupil position PP. In this case, the amount of protrusion that the prism 22 protrudes at the periphery of the see-through mirror 23, that is, above the see-through mirror 23 can be suppressed. Here, the distances d1 and d2 stand for the distance along the optical axis AX. When another optical element is added on the optical paths P2 and P3 inside of the see-through mirror 23, the values of the distances d1 and d2 may be determined by converting the added optical element into an optical path length or optical distance.

For the projection optical system 12, the position of light beams passing through the uppermost side in the longitudinal direction is equal to or less than 30 mm in relation to the longitudinal direction or the Y direction, with the center of the pupil position PP serving as a reference. Keeping light beams within such a range makes it possible to avoid the projection lens 21 or the display element 11 from being disposed sticking out in the upward direction or the +Y direction. Accordingly, the amount of the projection lens 21 or the display element 11 jutting out over the eyebrows can be suppressed to secure design quality. In other words, the optical unit 102 including the display element 11, the projection lens 21, and the prism 22 is made smaller.

In addition, for the projection optical system 12, the position of all the light beams from the see-through mirror 23 to the display element 11 is set to be equal to or greater than 13 mm in relation to the front direction or the Z direction, with the pupil position PP serving as a reference. Keeping light beams within such a range allows in particular the see-through mirror 23 to be disposed sufficiently separated in the forward direction or the +Z direction with respect to the pupil position PP. Accordingly, it is made easier to secure a space for disposing the inner lens 31 on the reflection surface 23a side of the see-through mirror 23.

In addition, for the projection optical system 12, the position of all the light beams from the see-through mirror 23 to the display element 11 is set to be equal to or less than 40 mm in relation to the forward direction or the Z direction, with the pupil position PP serving as a reference. Keeping light beams within such a range allows in particular the see-through mirror 23 to be disposed so as not to be excessively separated in the forward direction or the +Z direction with respect to the pupil position PP. Accordingly, the see-through mirror 23, the display device 11, and the like are suppressed from protruding to the front, making it easier to secure design quality. The lower end of the prism 22 is disposed at a position equal to or greater than 10 mm in relation to the longitudinal direction or the Y direction, with the center of the pupil position PP serving as a reference. Accordingly, it is easy to secure visual field when seeing through with an upward orientation of 20°, for example.

In the off-axis surface SO, an intermediate pupil IP is disposed between the projection lens 21 and the inner reflection surface 22b of the prism 22, and on the incident surface 22a side of the prism 22 than the projection lens 21 and the inner reflection surface 22b. More specifically, the intermediate pupil IP is disposed at the position of or in the vicinity of the incident surface 22a of the prism 22. For example, the intermediate pupil IP is disposed on the inner reflection surface 22b side with respect to the incident surface 22a of the prism 22. In this case, the position of the intermediate pupil IP is made closer to the incident surface 22a than the inner reflection surface 22b. The intermediate pupil IP may be disposed on the projection lens 21 side with respect to the incident surface 22a of the prism 22. In this case, the position of the intermediate pupil IP is made closer to the incident surface 22a than the emitting surface 22b of the projection lens 21. The intermediate pupil IP may intersect the incident surface 22a of the prism 22. The intermediate pupil IP means a location where imaging lights from the points on the display surface 11a spread out the most and overlap one on another. The intermediate pupil IP is disposed at the conjugate point of the eye ring ER or the pupil position PP. An aperture stop may be disposed at the position of or in the vicinity of the intermediate pupil IP.

An intermediate image IM is formed between the prism 22 and the see-through mirror 23. The intermediate image IM is formed at a position closer to the prism 22 than an intermediate point between the see-through mirror 23 and the prism 22. In this manner, forming the intermediate image IM near the prism 22 makes it possible to reduce the burden on the see-through mirror 23 in enlarging images, and suppress aberrations in the observed virtual image. However, the intermediate image IM is not in a state of intersecting the emitting surface 22c of the prism 22. In other words, the intermediate image IM is formed on an outer side of the emitting surface 22c, and this arrangement relationship is not limited to the off-axis surface SO, but holds true at any point in the lateral direction or the X direction that is perpendicular to the off-axis surface SO on the emitting surface 22c. In this manner, forming the intermediate image IM so as not to traverse the emitting surface 22c of the prism 22 makes it easier to avoid dust or scratches on the surface of the emitting surface 22c from affecting imaging.

The intermediate image IM is a real image formed in a position that is upstream of the eye ring ER in the optical path, and that is conjugate to the display surface 11a. The intermediate image IM has a pattern corresponding to the displayed image on the display surface 11a. However, the intermediate image IM need not be sharply imaged, and may exhibit aberrations such as field curvature, distortion aberration, and the like. As long as aberrations are finally corrected favorably for the virtual image observed at the pupil position PP, aberrations at the intermediate image IM are not problematic.

The shape of the projection lens 21, the prism 22, and the see-through mirror 23 will be described in detail below referring to FIGS. 4 and 5.

Figure 4:
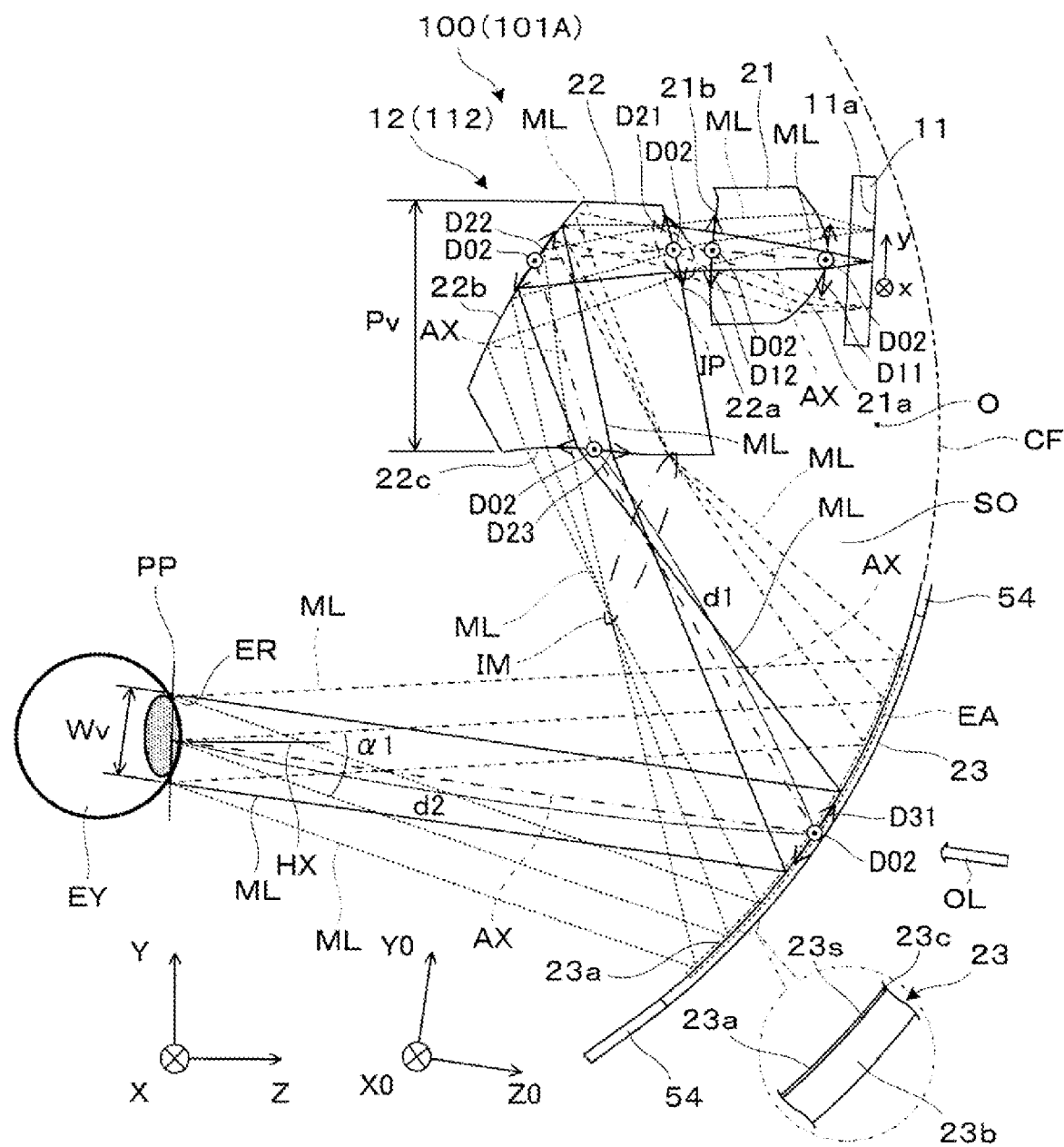
FIG. 4 is a longitudinal cutaway view illustrating an optical system of a virtual image display device.

FIG. 4 illustrates a longitudinal cutaway view of the projection optical system 12. FIG. 5 illustrates a plan cutaway view of the projection optical system 12. Note that FIG. 5 illustrates a state in which the incident surface 21a and the emitting surface 21b of the projection lens 21, the incident surface 22a, the inner reflection surface 22b, and the emitting surface 22c of the prism 22, as well as the reflection surface 23a of the see-through mirror 23 are projected onto the XZ plane through the optical axis AX.

The projection lens 21 of the present embodiment is constituted by a single lens. Note that the projection lens 21 may be constituted by a plurality of lenses. In the off-axis surface SO parallel to the YZ plane, the shapes of the incident surface 21a and the emitting surface 21b, which are optical surfaces constituting the projection lens 21, have an asymmetry across the optical axis AX in relation to first directions D11 and D12 in the longitudinal direction that intersect the optical axis AX, and have a symmetry across the optical axis AX in relation to a second direction D02 in the lateral direction that is orthogonal to the first directions D11 and D12 or the X direction. The first direction D11 in the longitudinal direction related to the incident surface 21a and the second direction D12 in the longitudinal direction related to the emitting surface 21b are at a predetermined angle.

The projection lens 21 is formed of a resin, for example, but may also be made of glass. The incident surface 21a and the emitting surface 21b of the projection lens 21 are each constituted by a free form surface, for example. Note that the incident surface 21a and the emitting surface 21b are not limited to a free form surface, and may be an aspheric surface. In the projection lens 21, making the incident surface 21a and the emitting surface 21b a free form surface or an aspheric surface allows aberrations to be reduced. In particular, using a free form surface makes it easy to reduce aberrations of the projection optical system 12, which is an off-axis optical system or a non-coaxial optical system. Note that a free form surface is a surface without an axis of rotational symmetry, and various polynomials may be used as a surface function of a free form surface. In addition, an aspheric surface is a surface having an axis of rotational symmetry, but is a surface other than a paraboloid or a spherical surface expressed by a polynomial. Although detailed description is omitted, an antireflective film is formed on the incident surface 21a and the emitting surface 21b.

As described above, in the projection lens 21, the first direction D11 of the incident surface 21a and the second direction D12 of the emitting surface 21b are at a predetermined angle; thus, the emitting surface 21b is formed to tilt with respect to the incident surface 21a in relation to the optical path of the main light beam from the center of the display surface 11a of the display element 11. In other words, there exists a relative angle or tilt between the incident surface 21a and the emitting surface 21b. Consequently, the eccentricity of the projection optical system 12 that is the off-axis system 112 can be partially compensated for in the projection lens 21, contributing to improvements in various aberrations. In addition, due to the relative tilt between the incident surface 21a and the emitting surface 21b, chromatic aberration of the projection lens 21 can be partially compensated for.

The prism 22 of the present embodiment is a catadioptric optical member having the combined function of a mirror and a lens. Therefore, the prism 22 reflects the imaging light ML emitted from the projection lens 21 while causing the imaging light ML to be refracted. More specifically, in the prism 22, the imaging light ML is incident into the inside via the incident surface 22a, which is a refractive surface; totally reflected in an irregular reflection direction by the inner reflection surface 22b, which is a reflection surface; and emitted to the outside via the emitting surface 22c, which is a refractive surface.

The incident surface 22a and the emitting surface 22c are optical surfaces constituted by a curved surface, and contribute to improved resolution compared to a case in which there exists only a reflection surface, or a case in which the incident surface 22a and the emitting surface 22c are planar surfaces. In the off-axis surface SO parallel to the YZ plane, the incident surface 22a, the inner reflection surface 22b, and the emitting surface 22c, which are optical surfaces constituting the prism 22, have an asymmetry across the optical axis AX in relation to first directions D21, D22, and D23 in the longitudinal direction that intersect the optical axis AX, and have a symmetry across the optical axis AX in relation to a second direction D02 in the lateral direction that is orthogonal to the first directions D21, D22, and D23 or the X direction. The prism 22 has a greater lateral width Ph in the lateral direction or the X direction than a longitudinal width Pv in the longitudinal direction or the Y direction. The prism 22 has a greater lateral width in the lateral direction or the X direction than the longitudinal width in the longitudinal direction or the Y direction, not only in terms of physical contour, but also in terms of optical effective area. Accordingly, the angle of view in the lateral direction or the Y direction can be increased. In addition, as described below, to correspond to the movement of an eye EY being large laterally, the image can be visually recognized even when the line-of-sight changes greatly in the lateral direction.

The prism 22 is formed of a resin, for example, but may also be made of glass. The refractive index of the main body of the prism 22 is set to a value such that total reflection at the inner surface is achieved taking into consideration the reflection angle of the imaging light ML. The refractive index and the Abbe number of the main body of the prism 22 may be set taking into consideration the relationship with the projection lens 21. In particular, increasing the Abbe number of the prism 22 or the projection lens 21 allows the chromatic dispersion to be decreased.

The optical surfaces of the prism 22, that is, the incident surface 22a, the inner reflection surface 22b, and the emitting surface 22c, are each constituted by a free form surface, for example. Note that each of the reflection surface 22a, the inner reflection surface 22b, and the emitting surface 22c is not limited to a free form surface, and may be an aspheric surface. In the prism 22, making each of the incident surface 22a, the inner reflection surface 22b, and the emitting surface 22c a free form surface or an aspheric surface allows aberrations to be reduced.

In particular, using a free form surface makes it easy to reduce aberrations of the projection optical system 12, which is an off-axis optical system or a non-coaxial optical system, allowing resolution to be improved. The inner reflection surface 22b is not limited to one that reflects the imaging light ML by total reflection, and may be a reflection surface made of a metal film or a dielectric multilayer film. In this case, onto the inner reflection surface 22b, a reflective film made of a single layer film or a multilayer film formed of a metal such as Al and Ag, for example, is deposited by vapor deposition and the like; alternatively, a sheet-like reflective film formed of a metal is affixed thereonto. Although detailed description is omitted, an antireflective film is formed on the incident surface 22a and the emitting surface 22c.

For the prism 22, the incident surface 22a, the inner reflection surface 22b, and the emitting surface 22c can be collectively formed by injection molding. This decreases the number of parts, and also makes it possible to enhance precision for mutual position of the three surfaces relatively inexpensively to a level such as equal to or less than 20 µm, for example.

The see-through mirror 23 is a plate-shaped optical member functioning as a concave surface mirror, and reflects the imaging light ML emitted from the prism 22. The see-through mirror 23 covers the pupil position PP where the eye EY or the pupil is disposed, and has a concave shape as seen from the pupil position PP. The see-through mirror 23 is constituted by a reflecting plate. The reflecting plate has a structure in which a mirror film 23c is formed on one surface 23s of a plate-shaped body 23b. The reflection surface 23a of the see-through mirror 23 is a transmissive front reflection surface.

In the off-axis surface SO parallel to the YZ plane, the shape of the reflection surface 23a of the see-through mirror 23 has an asymmetry across the optical axis AX in relation to a first direction D31 in the longitudinal direction that intersects the optical axis AX, and has a symmetry across the optical axis AX in relation to a second direction D02 in the lateral direction that is orthogonal to the first direction D31 or the X direction. The reflection surface 23a of the see-through mirror 23 is constituted by a free form surface, for example. Note that the reflection surface 23a is not limited to a free form surface, and may be an aspheric surface. Making the see-through mirror 23 a free form surface or an aspheric surface allows aberrations to be reduced. In particular, using a free form surface makes it easy to reduce aberrations of the projection optical system 12, which is an off-axis optical system or a non-coaxial optical system.

In either of a case in which the reflection surface 23a is a free form surface and a case in which the reflection surface 23a is an aspheric surface, the see-through mirror 23 has a shape in which the origin point O of the curved surface formula is shifted to the projection lens 21 side or the display element 11 side than the effective area EA of the see-through mirror 23. In this case, an inclined surface of a see-through mirror that realizes a Z-shaped optical path can be designed without excessive burden on the design of the optical system. The above-described curved surface formula of the reflection surface 23a corresponds to the shape of a curve CF represented by a two-dot-dash line on the off-axis surface SO, for example. Thus, the origin point O providing symmetry is disposed between the upper end of the see-through mirror 23 and the lower end of the display element 11.

The see-through mirror 23 is a transmissive reflection element configured to cause a part of the light incident on the see-through mirror 23 to be reflected and another part of the light to be transmitted. Therefore, the mirror film 23c of the see-through mirror 23 has a semi-transmissive reflectivity. Accordingly, an external light OL passes through the see-through mirror member 23, enabling a see-through view of the external world, and allowing the user to visually recognize a state in which a virtual image and an external image are superimposed one on the other.

Thinning the plate-shaped body 23b of the see-through mirror 23 to a thickness of equal to or less than approximately a few millimeters allows a change in magnification of the external image to be suppressed to a low level. The reflectance of the mirror film 23c with respect to the imaging light ML or the external light OL may be set to be equal to or greater than 10% and equal to or less than 50% in a range of the incident angle of the assumed imaging light ML from the viewpoints of securing luminance of the imaging light ML and facilitating observation of the external image by the see-through view.

The plate-shaped body 23b, which serves as a substrate of the see-through mirror 23, is formed of a resin, for example, but may also be made of glass. The plate-shaped body 23b is formed of the same material as that of the support plate 54 configured to support the plate-shaped body 23b from the periphery, and has the same thickness as that of the support plate 54. The mirror film 23c is formed of a dielectric multilayer film including a plurality of dielectric layers having a film thickness adjusted, for example. The mirror film 23c may also be constituted by a single layer film or a multilayer film of a metal such as Al and Ag having a film thickness adjusted. The mirror film 23c may be formed by stacking the above-described film, but may also be formed by affixing a sheet-like reflective film.

The optical path in the projection optical system 12 will be described below.

The imaging light ML emitted from the display element 11 is incident on the projection lens 21, and is emitted from the projection lens 21 in a substantially collimated state. The imaging light ML that passed through the projection lens 21 is incident on the incident surface 21a of the prism 22 while being refracted thereat; reflected at the inner reflection surface 22b with a reflectance close to 100%; and refracted again at the emitting surface 22c. The imaging light ML emitted from the prism 22 is incident on the see-through mirror 23, and reflected by the reflection surface 23a with a reflectance of equal to or less than approximately 50%. The imaging light ML reflected at the see-through mirror 23 is incident on the pupil position PP where the eye EY or the pupil of the user US is disposed.

The intermediate image IM is formed between the prism 22 and the see-through mirror 23 at a position close to the emitting surface 22c of the prism 22. The intermediate image IM is an image obtained by suitably enlarging an image formed on the display surface 11a of the display device 11. In addition, in addition to the imaging light ML, the external light OL that passed through the see-through mirror 23 or the support plate 54 at the periphery of the see-through mirror 23 is incident on the pupil position PP. In other words, the user US wearing the virtual image display device 100 can observe a virtual image by the imaging light ML superimposed with an external image.

Figure 5:
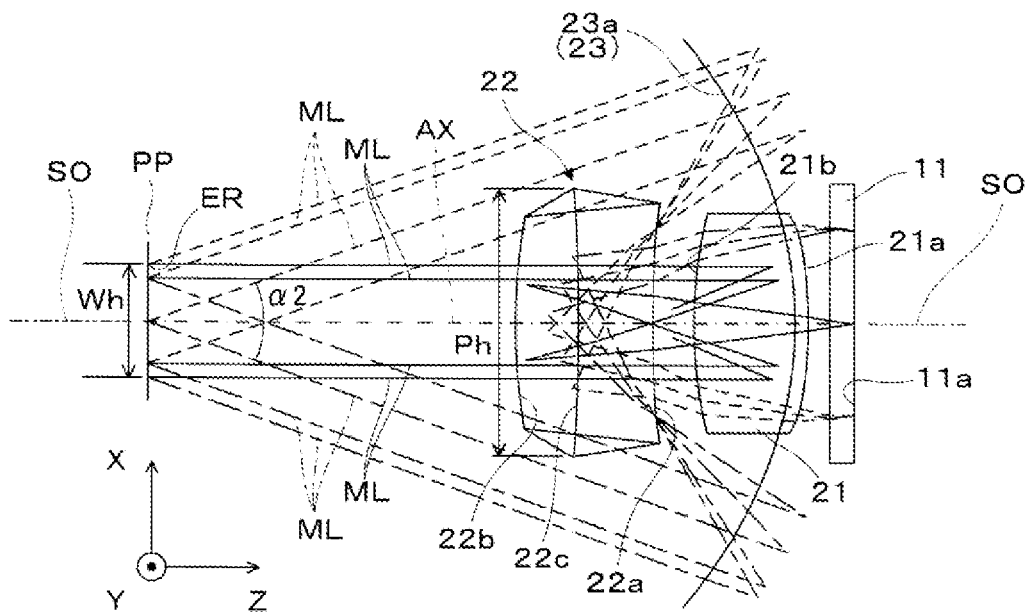
FIG. 5 is a plan cutaway view illustrating an optical system of a virtual image display device.

For the FOV of the projection optical system 12, as will be clear by comparing FIG. 4 and FIG. 5, a visual field angle α2 in the lateral direction is larger than a visual field angle α1 in the longitudinal direction. This corresponds to the displayed image formed on the display surface 11a of the display element 11 being longer in the horizontal direction than in the perpendicular direction. The aspect ratio between the dimension in the lateral direction and the dimension in the longitudinal direction of the display surface 11a is set to a value of 4:3, 16:9, and the like, for example.

Figure 6:
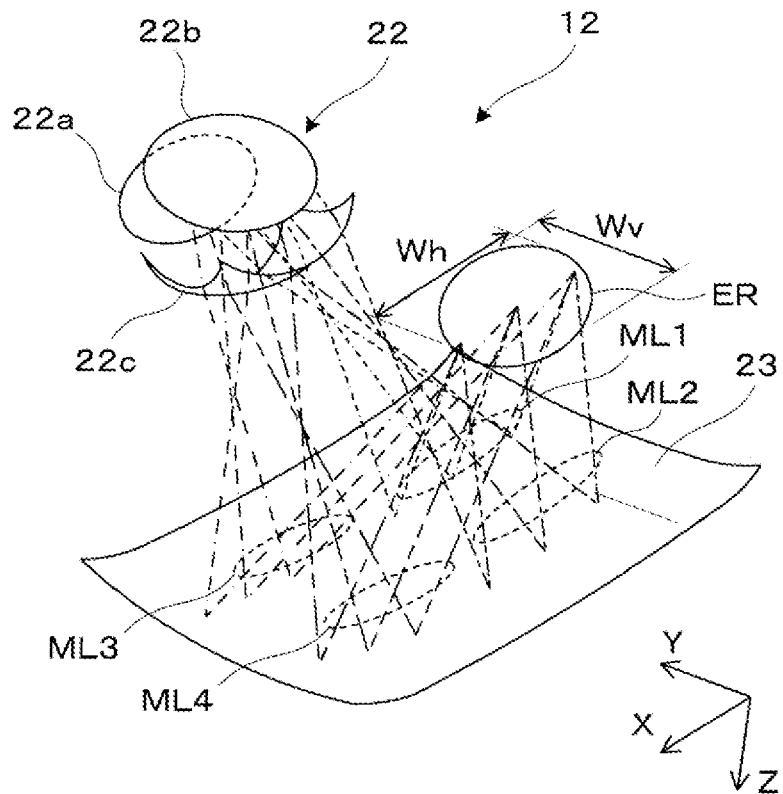
FIG. 6 is a perspective view for conceptually describing imaging by a projection optical system.

FIG. 6 is a perspective view conceptually describing imaging by the projection optical system 12.

In FIG. 6, imaging light ML1 indicates a light beam from the upper right direction in the visual field; the imaging light ML2 indicates a light beam from the lower right direction in the visual field; the imaging light ML3 indicates a light beam from the upper left direction in the visual field; and the imaging light ML4 indicates a light beam from the lower left direction in the visual field.

In this case, the eye ring ER set to the pupil position PP has an eye ring shape or pupil size such that a lateral pupil size Wh in the lateral direction or the X direction that is perpendicular to the off-axis surface SO is larger than a longitudinal pupil size Wv in the longitudinal direction or the Y direction that is orthogonal to the optical axis AX in the off-axis surface SO. In other words, the pupil size at the pupil position PP is wider in the lateral direction or the X direction orthogonal to the off-axis surface SO than in the longitudinal direction or the Y direction orthogonal to the lateral direction.

In a case in which the angle of view or the visual field in the lateral direction is made larger than the angle of view or the visual field in the longitudinal direction, changing the line-of-sight in keeping with the angle of view causes the eye position to move greatly in the lateral direction. Thus, the pupil size may be increased in the lateral direction. In other words, making the pupil size Wh of the eye ring ER in the lateral direction larger than the pupil size Wv in the longitudinal direction makes it possible to prevent or suppress images from being cut when the line-of-sight is changed greatly in the lateral direction. In the case of the projection optical system 12 illustrated in FIGS. 4 and 5, the FOV in the lateral direction is relatively large, and the FOV in the longitudinal direction is relatively small. As a result, the eye EY or the pupil of the user US also rotates in a large angular range in the lateral direction, and rotates in a small angular range in the longitudinal direction. Thus, in keeping with the movement of the eye EY, the pupil size Wh of the eye ring ER in the lateral direction is made larger than the pupil size Wv of the eye ring ER in the longitudinal direction.

As is clear from the description above, for example, when the FOV of the projection optical system 12 in the longitudinal direction is set to be larger than the FOV in the lateral direction, the pupil size Wh of the eye ring ER in the lateral direction may be made smaller than the pupil size Wv of the eye ring ER in the longitudinal direction. In the above description, when the optical axis AX from the see-through mirror 23 to the pupil position PP is oriented downward, the tilt of the eye ring ER and the size of the eye ring ER in the strict sense need to be considered with downwardly tilted coordinate systems X0, Y0, and Z0, where the optical axis AX is the Z0 direction, serving as a reference. In this case, the Y0 direction that is in the longitudinal direction does not strictly match the vertical direction or the Y direction. However, in a case in which such a tilt is not great, considering the tilt of the eye ring ER or the size of the eye ring ER with reference to the coordinate systems X, Y, and Z causes no problem for the purpose of approximation.

Although not illustrated, when the FOV of the projection optical system 12 is larger in the lateral direction than in the longitudinal direction to correspond to the size relationship between the pupil size Wh in the lateral direction and the pupil size Wv in the longitudinal direction of the eye ring ER, the intermediate pupil IP may also be set such that the pupil size in the lateral direction in the X direction is smaller than the pupil size in the longitudinal direction in the Y direction.

Figure 7:
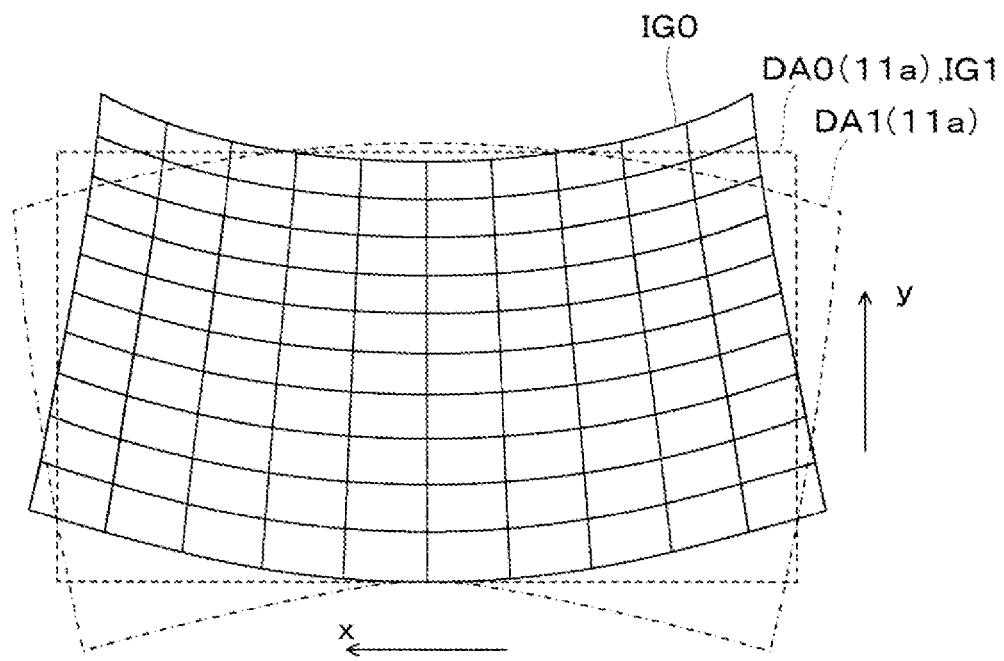
FIG. 7 is a view for describing forcible distortion to a displayed image formed on a display element.

As illustrated in FIG. 7, the original projected image IG0 indicating the imaging state by the projection optical system 12 has a relatively large distortion. However, because the projection optical system 12 is an off-axis system 112, it is not easy to remove distortion such as trapezoidal distortion. Therefore, even in a case in which distortion remains in the projection optical system 12, a pre-distorted modified image DA1 is used as a displayed image formed on the display surface 11a, with the original image being referred to as DA0. In other words, a modified image DA1 that includes a reverse distortion configured to cancel the distortion generated by the projection lens 21, the prism 22, and the see-through mirror 23 is used as an image displayed on the display element 11.

Accordingly, a grid pattern corresponding to the DA0 can be used as a pixel array of a projected image IG1 of the virtual image observed at the pupil position PP via the projection optical system 12, and the profile of the projected image IG1 can be rectangular. As a result, aberrations can be suppressed for the entire optical module 101A including the display element 11 while allowing distortion aberrations generated by the see-through mirror 23 and the like. When the display surface 11a has a rectangular contour, forming a forcible distortion causes a margin to be formed at the rim portion of the display surface 11a, and additional information may be displayed in such a margin. The modified image DA1 formed on the display surface 11a is not limited to those in which a forcible distortion is formed by image processing, and may be those in which an array of display pixels formed on the display surface 11a are changed to correspond to forcible distortion, for example. In this case, image processing for correcting distortion is not needed. Furthermore, the display surface 11a may be curved to correct an aberration.

As described above, the distortion caused by the projection optical system 12 can be corrected by incorporating distortion configured to cancel the distortion generated in the projection optical system 12 into the image displayed on the display element 11. Conversely, because the distortion generated in the projection optical system 12 can be corrected by the display element 11, an optical system that allows generation of distortion can be adopted, which makes it possible to decrease the number of parts of the optical module and downsize the optical module.

However, when assembly errors and the like during manufacturing of the optical module 101A cause a variation in positioning between optical members constituting the projection optical system 12, it is impossible to uniformly correct distortion, which makes precise correction difficult. As a result, the resolution of the virtual image may decrease, and display quality of the image may deteriorate.

A positioning structure between optical members that constitute the projection optical system 12 will be described below.

Figure 8:
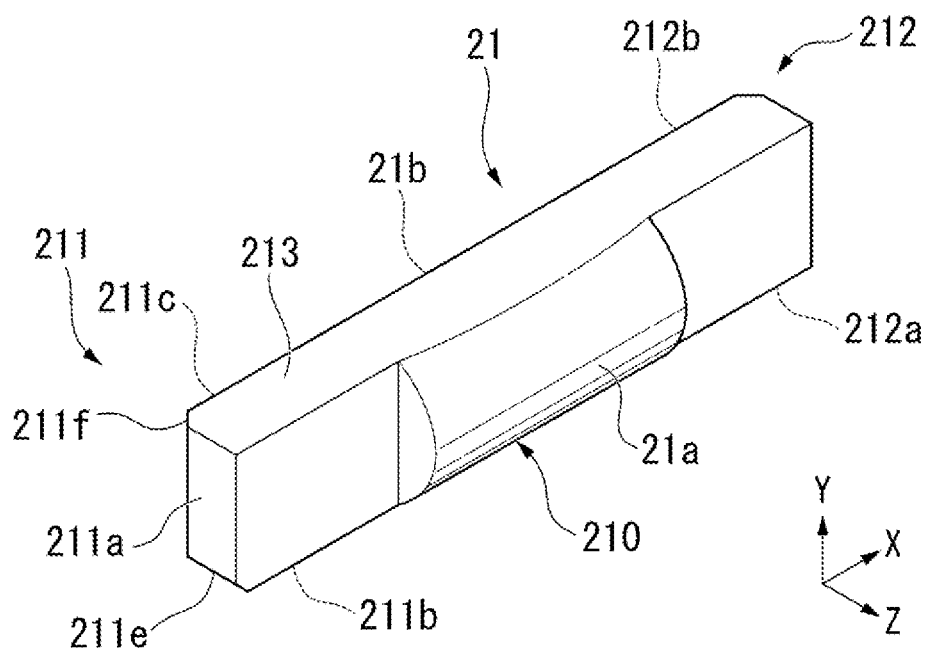
FIG. 8 is a perspective view of a projection lens.
Figure 9:
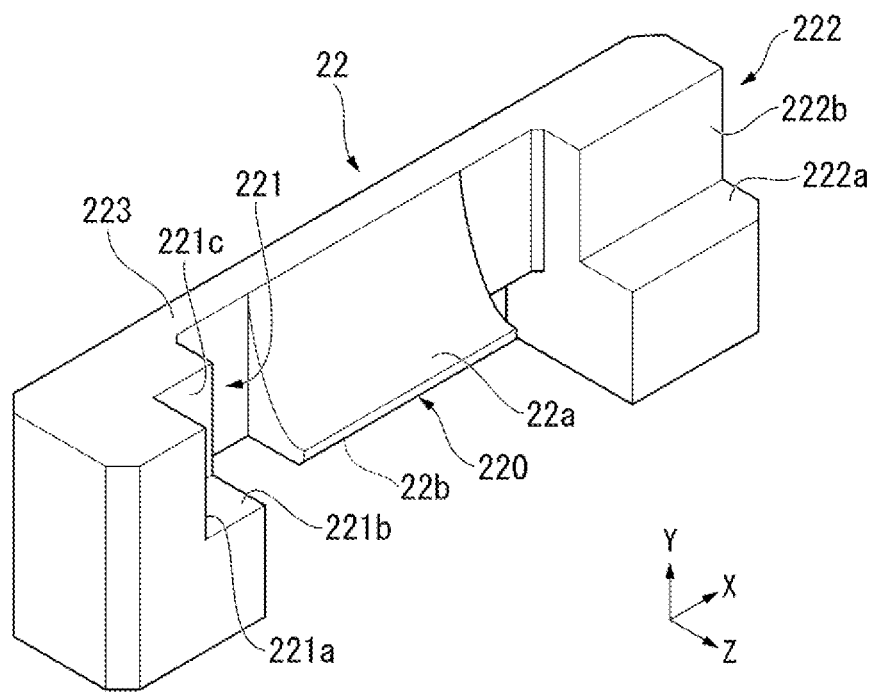
FIG. 9 is a perspective view of a prism.
Figure 10:
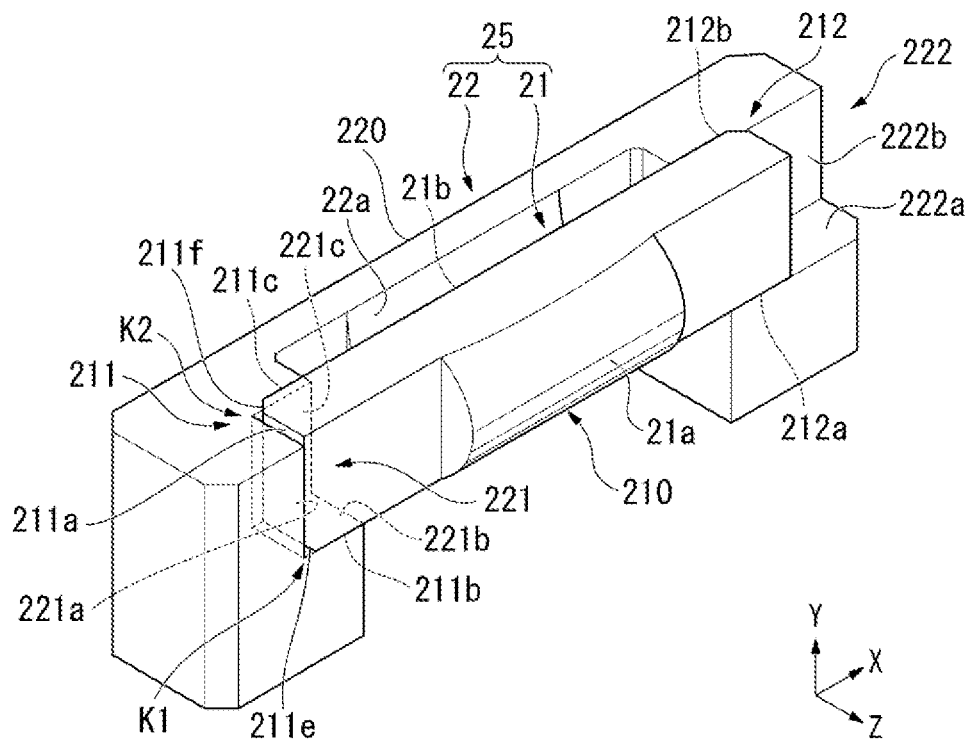
FIG. 10 is a perspective view of an assembly of a projection lens and a prism.

FIG. 8 is a perspective view of the projection lens 21. FIG. 9 is a perspective view of the prism 22. FIG. 10 is a perspective view of an assembly 25 in which the projection lens 21 and the prism 22 are combined.

The optical module 101A according to the present embodiment includes a positioning structure between the projection lens 21 and the prism 22 from among the projection lens 21, the prism 22, and the see-through mirror 23 that constitute the projection optical system 12.

The projection lens 21 of the present embodiment corresponds to the first positioning member in the claims. The prism 22 of the present embodiment corresponds to the second positioning member in the claims.

As illustrated in FIG. 8, the projection lens 21 includes a projection lens main body 210, a first positioning portion 211, and a first fixing portion 212. The projection lens main body 210 is a section configured to practically function as a focusing element to focus the imaging light emitted from the display element 11. The projection lens 21 includes the incident surface 21a and the emitting surface 21b.

The first positioning portion 211 is a section for performing positioning of the projection lens 21 with respect to the prism 22. The first positioning portion 211 is provided, in the plane intersecting the traveling direction of the imaging light in the projection lens 21, that is, in the XY plane intersecting the Z direction that is the traveling direction of the imaging light, on an outer side of the incident surface 21a on which the imaging light is incident. Specifically, the first positioning portion 211 is provided, in the XY plane, on one side in the lateral direction (−X direction) of the incident surface 21a. Therefore, the first positioning portion 211 is constituted by a convex portion constituted by a corner portion of the plate portion 213 provided in the −X direction from the projection lens main body 210.

The incident surface 21a of the present embodiment corresponds to the first optical surface in the claims.

The first positioning portion 211 includes a first positioning surface 211a along the YZ plane, a second positioning surface 211b along the XZ plane intersecting the first positioning surface 211a, and a third positioning surface 211c along the XY plane intersecting the first positioning surface 211a and the second positioning surface 211b. Therefore, the first positioning surface 211a, the second positioning surface 211b, and the third positioning surface 211c are orthogonal to each other. In addition, the corner portion where the first positioning surface 211a and the second positioning surface 211b come into contact with each other, and the corner portion where the first positioning surface 211a and the third positioning surface 211c come into contact with each other are chamfered. In other words, the first positioning portion 211 further includes a first chamfered surface 211e provided at the corner portion where the first positioning surface 211a and the second positioning surface 211b come into contact with each other, and a second chamfered surface 211f provided at the corner portion where the first positioning surface 211a and the third positioning surface 211c come into contact with each other.

The first fixing portion 212 is a section configured to be used to fix the projection lens 21 with respect to the prism 22. The first fixing portion 212 is provided on the other side of the lateral direction (+X direction) with respect to the incident surface 21a in the XY plane. In other words, the first fixing portion 212 is provided, in the XY plane, on the side opposite to the side on which the first positioning portion 211 is provided with respect to the incident surface 21a. The first fixing portion 212 includes a first abutting surface 212a along the XZ plane and a second abutting surface 212b along the XY plane that intersects the first abutting surface 212a.

In this manner, the projection lens 21 is configured as a member in which the projection lens main body 210, the first positioning portion 211, and the first fixing portion 212 are integrated by a material such as a resin, for example.

As illustrated in FIG. 9, the prism 22 includes a prism main body 220, a second positioning portion 221, and a second fixing portion 222. The prism main body 220 is a section configured to practically function as a catadioptric element to reflect the imaging light emitted from the projection lens 21 while causing the imaging light to be refracted. The prism 22 includes the incident surface 22a, the inner reflection surface (illustration omitted), and the emitting surface 22c.

The second positioning portion 221 is a section for performing positioning of the prism 22 with respect to the projection lens 21. The second positioning portion 221 is provided, in the plane intersecting the traveling direction of the imaging light between the incident surface 22a and the inner reflection surface in the prism 22, that is, in the XY plane intersecting the Z direction that is the traveling direction of the imaging light, on an outer side of the incident surface 22a on which the imaging light is incident. Specifically, the second positioning portion 221 is provided, in the XY plane, on one side in the lateral direction (−X direction) of the incident surface 22a. The second positioning portion 221 is constituted by a concave portion provided at a corner portion of the plate portion 223 extending in the −X direction from the prism main body 220. The incident surface 22a of the present embodiment corresponds to the second optical surface in the claims.

The second positioning portion 221 is constituted by a concave portion that is recessed in a generally cuboid shape to correspond to the shape of the first positioning portion 211. The second positioning portion 221 includes a fourth positioning surface 221a along the YZ plane, a fifth positioning surface 221b along the XZ plane intersecting the fourth positioning surface 221a, and a sixth positioning surface 221c along the XY plane that intersects the fourth positioning surface 221a and the fifth positioning surface 221b. Therefore, the fourth positioning surface 221a, the fifth positioning surface 221b, and the sixth positioning surface 221c are orthogonal to each other. As illustrated in FIG. 10, when the projection lens 21 and the prism 22 are combined, the fourth positioning surface 221a comes into contact with the first positioning surface 211a; the fifth positioning surface 221b comes into contact with the second positioning surface 211b; and the sixth positioning surface 221c comes into contact with the third positioning surface 211c.

The second fixing portion 222 is a section configured to be used to fix the prism 22 with respect to the projection lens 21. The second fixing portion 222 is provided on the other side of the lateral direction (+X direction) with respect to the incident surface 22a in the XY plane. In other words, the second fixing portion 222 is provided, in the XY plane, on the side opposite to the side on which the second positioning portion 221 is provided with respect to the incident surface 22a. The second fixing portion 222 is constituted by a concave portion corresponding to the first fixing portion 212 of the projection lens 21. The second fixing portion 222 includes a third abutting surface 222a along the XZ plane and a fourth abutting surface 222b along the XY plane that intersects the third abutting surface 222a.

In this manner, the prism 22 is configured as a member in which the prism main body 220, the second positioning portion 221, and the second fixing portion 222 are integrated by a material such as a resin, for example.

When manufacturing the optical module 101A according to the present embodiment, the first positioning portion 211 and the second positioning portion 221 are brought into contact with each other to perform positioning between the projection lens 21 and the prism 22. Thereafter, the projection lens 21 and the prism 22 are joined to each other using an adhesive. In other words, the method of manufacturing the optical module 101A according to the present embodiment includes bringing the first positioning portion 211 and the second positioning portion 221 into contact with each other to perform positioning between the projection lens 21 and the prism 22, and in a state in which the positioning is performed, joining the projection lens 21 and the prism 22 to each other through an adhesive layer.

As illustrated in FIG. 10, when combining the projection lens 21 and the prism 22, the positioning surfaces 211a, 211b, and 211c of the first positioning portion 211 are butted against the positioning surfaces 221a, 221b, and 221c of the second positioning portion 221, respectively, such that the first positioning surface 211a of the first positioning portion 211 comes into contact with the fourth positioning surface 221a of the second positioning portion 221, the second positioning surface 211b of the first positioning portion 211 comes into contact with the fifth positioning surface 221b of the second positioning portion 221, and the third positioning surface 211c of the first positioning portion 211 comes into contact with the sixth positioning surface 221c of the second positioning portion 221. At this time, the first abutting surface 212a of the third fixing portion 212 comes into contact with the third abutting surface 222a of the second fixing portion 222, and the second abutting surface 212b of the first fixing portion 212 comes into contact with the fourth abutting surface 222b of the second fixing portion 222.

Accordingly, the first positioning surface 211a and the fourth positioning surface 221a coming into contact with each other restricts the projection lens 21 from relative movement in the −X direction with respect to the prism 22, causing positioning in the X direction to be accomplished. In addition, the second positioning surface 211b and the fifth positioning surface 221b coming into contact with each other restricts the projection lens 21 from relative movement in the −Y direction with respect to the prism 22, causing positioning in the Y direction to be accomplished. In addition, the third positioning surface 211c and the sixth positioning surface 221c coming into contact with each other restricts the projection lens 21 from relative movement in the −Z direction with respect to the prism 22, causing positioning in the Z direction to be accomplished. Note that although positioning of the projection lens 21 with respect to the prism 22 in each direction is accomplished at this stage, the concave portion constituting the second positioning portion 221 is open on one side in each direction, Thus, the projection lens 21 is not restricted from relative movement with respect to the prism 22 in the +X direction, the +Y direction, and the +Z direction.

Next, when joining the projection lens 21 and the prism 22 to each other, an adhesive is applied to a triangular prism-shaped gap K1 surrounded by the fourth positioning surface 221a, the fifth positioning surface 221b, and the first chamfered surface 211e; a triangular prism-shaped gap K2 surrounded by the fourth positioning surface 221a, the sixth positioning surface 221c, and the second chamfered surface 211f; and any location where the first fixing portion 212 and the second fixing portion 222 come into contact with each other, Thereafter, the adhesive is cured. For the adhesive, an adhesive including an ultraviolet-curable resin can be used, for example. In this case, irradiating the adhesive after application with ultraviolet light allows the adhesive to be cured. Note that the type of the adhesive is not particularly limited. In this manner, in the first positioning portion 211 of the present embodiment, chamfering the corner portion where the first positioning surface 211a and the second positioning surface 211b come into contact with each other, and the corner portion where the first positioning surface 211a and the third positioning surface 211c come into contact with each other causes the above-described triangular prism-shaped gaps K1 and K2 to be created, with the gaps K1 and K2 functioning as adhesive pockets.

Accordingly, the projection lens 21 and the prism 22 are fixed to each other, and the assembly 25 of the projection lens 21 and the prism 22 is produced. At this stage, the projection lens 21 is restricted from relative movement with respect to the prism 22 in the +X direction, the +Y direction, and the +Z direction. Furthermore, the projection lens 21 is restricted not only from translation in the above-described directions, but also simultaneously from relative rotation with respect to the prism 22 about the X-axis, about the Y-axis, and about the Z-axis.

In this manner, the optical module 101A according to the present embodiment has a configuration in which, in a state in which positioning between the projection lens 21 and the prism 22 is accomplished by the first positioning portion 211 and the second positioning portion 221 coming into contact with each other, the projection lens 21 and the prism 22 are joined to each other through an adhesive layer.

Note that in the present embodiment, the first fixing portion 212 and the second fixing portion 222 are also configured such that surfaces facing each other in the Y direction and the Z direction come into contact with each other. Thus, the first fixing portion 212 and the second fixing portion 222 have a positioning function with respect to the Y direction and the Z direction. However, because positioning with respect to all directions is accomplished by the first positioning portion 211 and the second positioning portion 221, for the first fixing portion 212 and the second fixing portion 222, surfaces facing each other need not necessarily come into contact with each other, and may be separated. However, when surfaces facing each other of the first fixing portion 212 and the second fixing portion 222 are configured to come into contact with each other as in the present embodiment, positioning can be more stably performed, and the projection lens 21 can be stably supported relative to the prism 22 at a stage before the adhesive cures.

In addition, the optical module 101A according to the present embodiment has a configuration in which the projection lens 21 and the prism 22 are glued at both a position of the first positioning portion 211 and the second positioning portion 221, and a position of the first fixing portion 212 and the second fixing portion 222. In place of this configuration, the optical module 101A may have a configuration in which the projection lens 21 and the prism 22 are adhered to at either a position of the first positioning portion 211 and the second positioning portion 221, or a position of the first fixing portion 212 and the second fixing portion 222.

In addition, the first positioning surface 211a and the fourth positioning surface 221a, the second positioning surface 211b and the fifth positioning surface 221b, and the third positioning surface 211c and the sixth positioning surface 221c, which face each other, need not necessarily be in direct contact, and an adhesive layer may be interposed between positioning surfaces facing each other. Even in this case, taking into consideration the thickness of the adhesive layer in advance enables positioning of the projection lens 21 and the prism 22.

Therefore, in the present disclosure, concepts such as "the first positioning portion and the second positioning portion coming into contact with each other" and "a fourth positioning surface coming into contact with the first positioning surface" in the claims include a case in which they come into contact with each other through an adhesive layer.

As described above, in the virtual image display device 100 according to the present embodiment, aberrations can be corrected by the prism 22, which makes it possible to improve the resolution, downsize the optical system, and thus downsize the entire device. In addition, in the off-axis surface SO of the off-axis system 112, the intermediate pupil IP is disposed between the projection lens 21 and the inner reflection surface 22b on the incident surface 22a side of the prism 22 than the projection lens 21 and the inner reflection surface 22b, making it easier to secure telecentricity on the display element 11 side while avoiding upsizing the optical system. In addition, the intermediate pupil IP being disposed at this position makes it easy to shorten the focal length and increase the magnification, making it possible to make the display element 11 smaller while bringing the display element 11 closer to the prism 22 and the like. In addition, since the intermediate image IM is formed between the prism 22 and the see-through mirror 23, the prism 22 can be made smaller.

In addition, in the optical module 101A according to the present embodiment, unlike traditional optical modules, mutual positioning of the projection lens 21 and the prism 22 can be made by the optical members themselves without using other supporting members such as a lens barrel. This makes it possible to downsize the device without increasing the number of parts. In addition, no support member is interposed for positioning purposes. Thus, no assembly error is caused between optical members such as the projection lens 21 and the prism 22 and support members, allowing positioning accuracy to be enhanced compared to traditional optical modules. Accordingly, variation in the positional relationship between the projection lens 21 and the prism 22 that constitute the projection optical system 12 can be reduced, allowing image distortion to be appropriately corrected. As a result, degradation of the virtual image resolution associated with distortion correction can be suppressed and display quality can be enhanced.

In addition, in the optical module 101A according to the present embodiment, the first positioning portion 211 of the projection lens 21 is provided on an outer side of the incident surface 21a of the projection lens main body 210, and the second positioning portion 221 of the prism 22 is provided on an outer side of the incident surface 22a of the prism main body 220. According to this configuration, the positioning portions 211 and 221 do not impair the original optical function of the projection lens 21 or the prism 22, and the display quality does not deteriorate due to the provision of positioning portions 211 and 221.

Furthermore, in the optical module 101A according to the present embodiment, the first positioning portion 211 of the projection lens 21 is provided on one side in the lateral direction of the incident surface 21a of the projection lens main body 210, and the second positioning portion 221 of the prism 22 is provided on one side in the lateral direction of the incident surface 22a of the prism main body 220. According to this configuration, the provision of the positioning portions 211 and 221 makes it possible to suppress the dimension of the virtual image display device 100 in the upward and downward direction from being increased.

In addition, the optical module 101A according to the present embodiment has a configuration in which positioning is accomplished by surfaces facing each other of the projection lens 21 and the prism 22 coming into contact with each other, such as the first positioning surface 211a and the fourth positioning surface 221a, the second positioning surface 211b and the fifth positioning surface 221b, and the third positioning surface 211c and the sixth positioning surface 221c. According to this configuration, two surfaces having a predetermined area coming into contact with each other allows stable positioning to be performed. In addition, positioning operation can be performed by simply butting two surfaces against each other, making it possible to enhance workability during assembly of the optical module 101A.

In addition, in the optical module 101A according to the present embodiment, the corner portion where the first positioning surface 211a and the second positioning surface 211b of the first positioning portion 211 come into contact with each other, and the corner portion where the first positioning surface 211a and the third positioning surface 211c come into contact with each other are chamfered to form the gaps K1 and K2 that serve as adhesive pockets, and an adhesive is applied to these gaps K1 and K2. According to this configuration, positioning surfaces facing each other are in a state of being in direct contact without an adhesive layer being interposed. Accordingly, shifting in the relative position between the projection lens 21 and the prism 22 can be made smaller, and display quality can be ensured.

First Modified Example

The optical module according to the above-described embodiment may have the following configuration.

Figure 11:
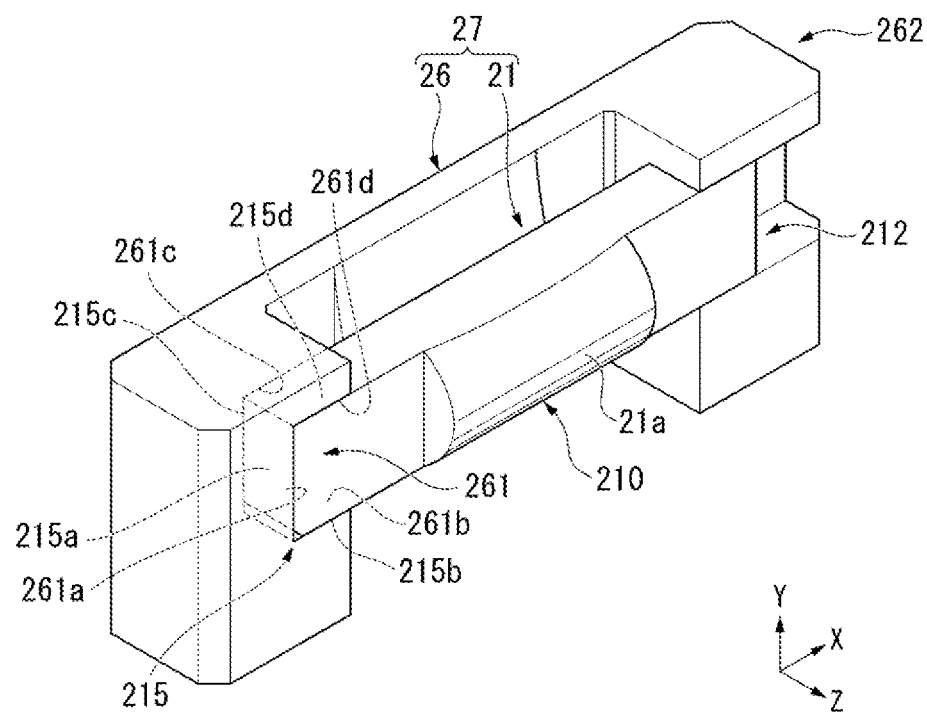
FIG. 11 is a perspective view illustrating an assembly of a first modified example.

FIG. 11 is a perspective view of an assembly 27 in which the projection lens 21 and a prism 26 are combined in an optical module according to a first modified example. In FIG. 11, the components common to those of the drawings of the above-described embodiment are denoted with the same reference numerals, and the description thereof is omitted.

As illustrated in FIG. 11, in the optical module according to the first modified example, the configuration of the projection lens 21 is the same as the configuration of the projection lens 21 of the above-described embodiment. In addition, the dimension of a second positioning portion 261 of the prism 26 in the height direction, that is, in the Y direction, is greater than the dimension of the second positioning portion 221 of the above-described embodiment in the Y direction. Accordingly, while the first positioning portion 211 of the projection lens 21 is open on the upper side in the above-described embodiment, the upper side of the first positioning portion 211 of the projection lens 21 is covered by the second positioning portion 261 of the prism 26 in the present modified example.

In other words, in the optical module according to the present modified example, a first positioning portion 215 of the projection lens 21 includes a first positioning surface 215a along the YZ plane, a second positioning surface 215b along the XZ plane that intersects the first positioning surface 215a, a third positioning surface 215c along the XY plane that intersects the first positioning surface 215a and the second positioning surface 215b, and a seventh positioning surface 215d along the XZ plane that faces the second positioning surface 215b. In addition, the second positioning portion 261 of the prism 26 includes a fourth positioning surface 261a that comes into contact with the first positioning surface 215a, a fifth positioning surface 261b that comes into contact with the second positioning surface 215b, a sixth positioning surface 261c that comes into contact with the third positioning surface 215c, and an eighth positioning surface 261d that comes into contact with the seventh positioning surface 215d.

In addition, the dimension of a second fixing portion 262 of the prism 26 in the height direction, that is, in the Y direction, is greater than the dimension of the second fixing portion 222 of the prism 22 of the above-described embodiment in the Y direction. Accordingly, in the present modified example, the upper part of the first fixing portion 212 of the projection lens 21 is covered by the second fixing portion 262 of the prism 26. Other configurations of the optical module are similar to those of the optical module according to the above-described embodiment.

In the optical module according to the present modified example as well, advantages similar to those of the above-described embodiment are obtained, such as that positioning between optical members can be performed without increasing the number of parts; that the device can be downsized; that image distortion can be sufficiently corrected; and that display quality can be enhanced. In particular, in the case of the present modified example, the second positioning portion 261 of the prism 26 restricts the projection lens 21 from relative movement in the −X direction, relative movement in the −Y direction, relative movement in the −Z direction, as well as relative movement in the +Y direction with respect to the prism 26. Accordingly, positioning between the projection lens 21 and the prism 26 can be more stably performed.

Second Modified Example

Figure 12:
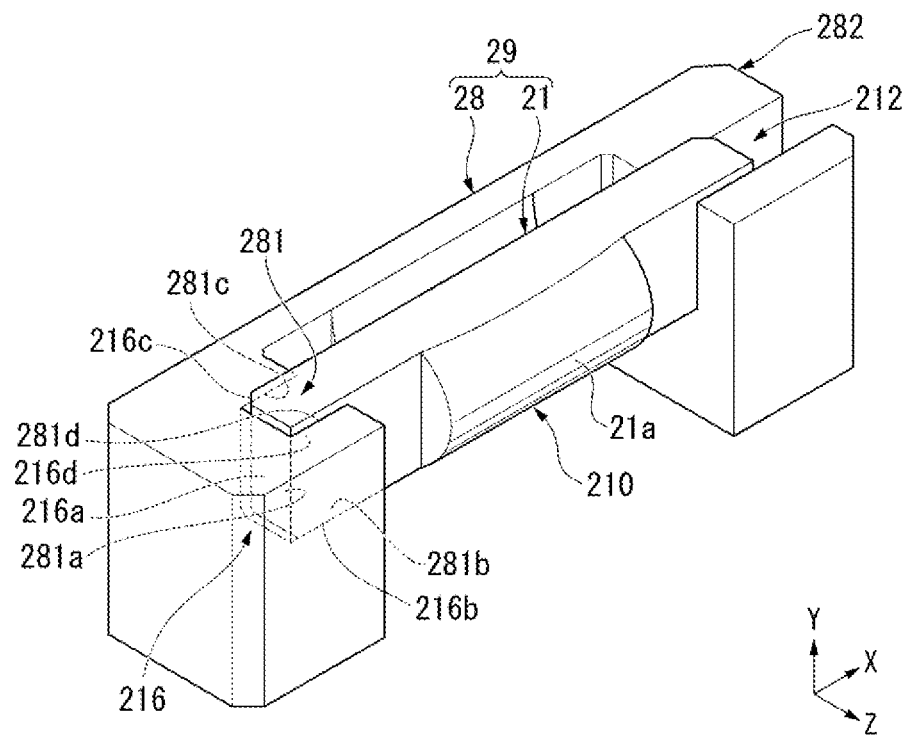
FIG. 12 is a perspective view illustrating an assembly of a second modified example.

FIG. 12 is a perspective view of an assembly 29 in which the projection lens 21 and a prism 28 are combined in an optical module according to a second modified example. In FIG. 12, the components common to those of the drawings of the above-described embodiment are denoted with the same reference numerals, and the description thereof is omitted.

As illustrated in FIG. 12, in the optical module according to the second modified example, the configuration of the projection lens 21 is the same as the configuration of the projection lens 21 of the above-described embodiment. In addition, the dimension of a second positioning portion 281 of the prism 28 in the depth direction, that is, in the Z direction, is greater than the dimension of the second positioning portion 221 of the prism 22 of the above-described embodiment in the Z direction. Accordingly, while the first positioning portion 211 of the projection lens 21 is open to the front in the above-described embodiment, the front of the first positioning portion 211 of the projection lens 21 is covered by the second positioning portion 281 of the prism 28 in the present modified example.

In other words, in the optical module according to the present modified example, a first positioning portion 216 of the projection lens 21 includes a first positioning surface 216a along the YZ plane, a second positioning surface 216b along the XZ plane that intersects the first positioning surface 216a, a third positioning surface 216c along the XY plane that intersects the first positioning surface 216a and the second positioning surface 216b, and a ninth positioning surface 216d along the XY plane that faces the third positioning surface 216c. In addition, the second positioning portion 281 of the prism 28 includes a fourth positioning surface 281a that comes into contact with the first positioning surface 216a, a fifth positioning surface 281b that comes into contact with the second positioning surface 216b, a sixth positioning surface 281c that comes into contact with the third positioning surface 216c, and a tenth positioning surface 281d that comes into contact with the ninth positioning surface 216d.

In addition, the dimension of a second fixing portion 282 of the prism 28 in the forward and backward directions, that is, in the Z direction, is greater than the dimension of the second fixing portion 222 of the prism 22 of the above-described embodiment in the Z direction. Accordingly, in the present modified example, the back of the first fixing portion 212 of the projection lens 21 is covered by the second fixing portion 282 of the prism 28. Other configurations of the optical module are similar to those of the optical module according to the above-described embodiment.

In the optical module according to the present modified example as well, advantages similar to those of the above-described embodiment are obtained, such as that positioning between optical members can be performed without increasing the number of parts; that the device can be downsized; that image distortion can be sufficiently corrected; and that display quality can be enhanced. In particular, in the case of the present modified example, the second positioning portion 281 of the prism 28 restricts the projection lens 21 from relative movement in the −X direction, relative movement in the −Y direction, relative movement in the −Z direction, as well as relative movement in the +Z direction with respect to the prism 28. Accordingly, positioning between the projection lens 21 and the prism 28 can be more stably performed.

Second Embodiment

A second embodiment according to the present disclosure will be described below using FIGS. 13 to 15.

The basic configuration of a virtual image display device and an optical module according to the second embodiment is similar to that of the first embodiment except that the positioning structure between optical members is different from that of the first embodiment. Consequently, description of the overall configuration of the virtual image display device and the optical module will be omitted.

Figure 13:
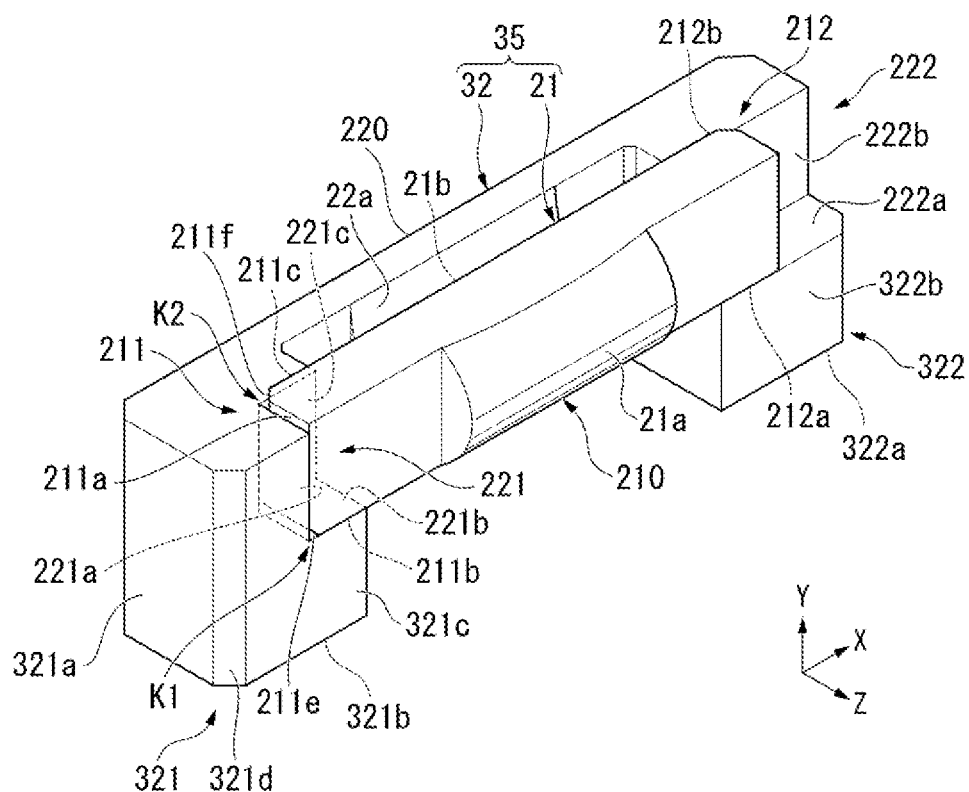
FIG. 13 is a perspective view of an assembly of a projection lens and a prism that constitute a virtual image display device according to a second embodiment.

FIG. 13 is a perspective view of an assembly 25 of the projection lens 21 and a prism 22 that constitute a virtual image display device according to the present embodiment. FIG. 14 is a perspective view of a see-through mirror 33. FIG. 15 is a perspective view illustrating a state in which the assembly 35 and the see-through mirror 33 are assembled.

Figure 14:
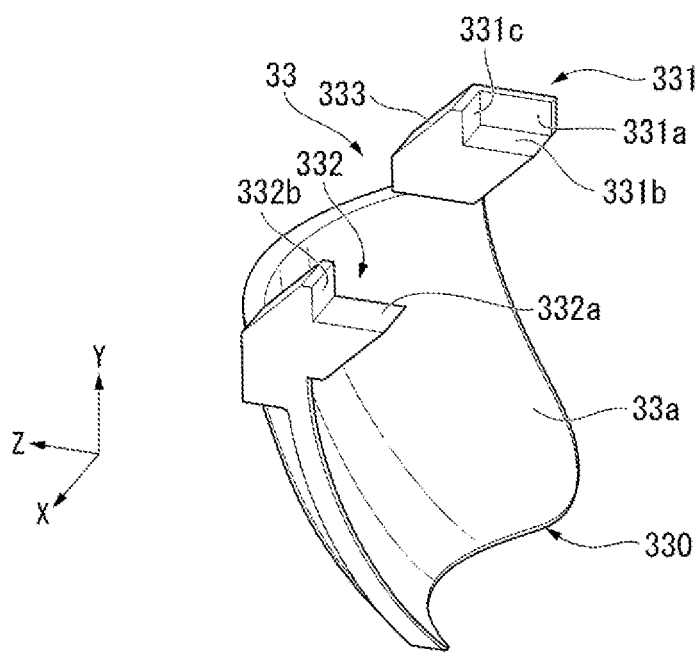
FIG. 14 is a perspective view of a see-through mirror.
Figure 15:
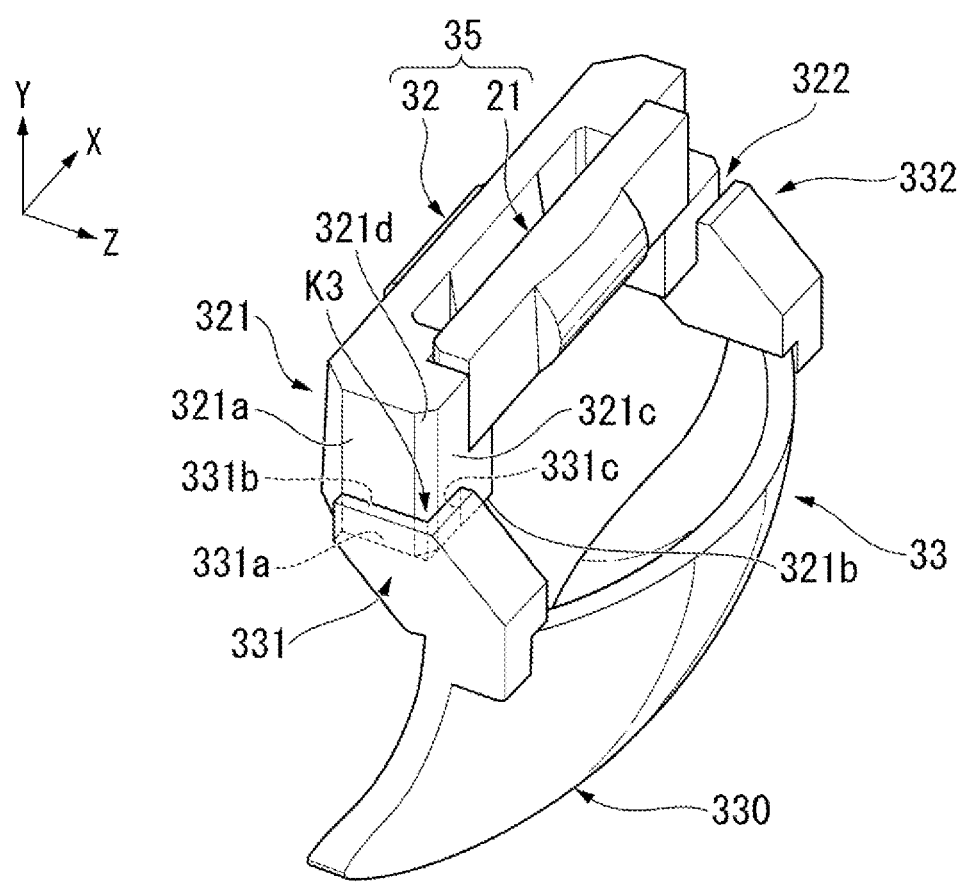
FIG. 15 is a perspective view illustrating a state in which an assembly and a see-through mirror are combined.

In FIGS. 13 to 15, the components common to those of the drawings of the first embodiment are denoted with the same reference numerals, and the description thereof is omitted.

The optical module 101A according to the first embodiment has a positioning structure between the projection lens 21 and the prism 22. The see-through mirror 23 is fixed to the support plate 54, and relative positioning between the projection lens 21 and the prism 22 is accomplished via the support plate 54. In contrast, the optical module according to the present embodiment has a positioning structure configured to carry out direct positioning of the see-through mirror 33 relative to the assembly 35 of the projection lens 21 and the prism 32. In other words, in the optical module according to the present embodiment, the projection lens 21, the prism 32, and the see-through mirror 33 are combined without any other member interposed therebetween, and are mutually positioned.

The projection lens 21 of the present embodiment corresponds to the first positioning member in the claims. The prism 32 of the present embodiment corresponds to the second positioning member in the claims. The see-through mirror 33 of the present embodiment corresponds to the third positioning member in the claims.

As illustrated in FIG. 13, the contour of the assembly 35 of the projection lens 21 and the prism 32 of the present embodiment is similar to the contour of the assembly 25 of the first embodiment illustrated in FIG. 10. However, the see-through mirror 33 described below includes a third positioning portion 331 configured to perform positioning with respect to the prism 32, and the prism 32 includes a fourth positioning portion 321 configured to perform positioning with respect to the see-through mirror 33.

The prism 32 includes the prism main body 220, the second positioning portion 221, the second fixing portion 222, the fourth positioning portion 321, and a fourth fixing portion 322. Of the above-described components, the prism main body 220, the second positioning portion 221, and the second fixing portion 222 are the same as those of the first embodiment, and thus description thereof will be omitted.

As described above, the fourth positioning portion 321 is a section for performing positioning of the prism 32 with respect to the see-through mirror 33. The fourth positioning portion 321 is provided, in the plane intersecting the traveling direction of the imaging light in the prism 32, that is, in the XY plane intersecting the Z direction, which is the traveling direction of the imaging light, on an outer side of the incident surface 22a on which the imaging light is incident. Specifically, the fourth positioning portion 321 is provided, in the XY plane, on one side in the lateral direction (the −X direction) of the incident surface 22a. The fourth positioning portion 321 is constituted by a convex portion constituted by a corner portion of a plate portion provided in the −X direction with respect to the prism main body 220.

The fourth positioning portion 321 includes an eleventh positioning surface 321a along the YZ plane, a twelfth positioning surface 321b along the XZ plane that intersects the eleventh positioning surface 321a, and a thirteenth positioning surface 321c along the XY plane that intersects the eleventh positioning surface 321a and the twelfth positioning surface 321b. Therefore, the eleventh positioning surface 321a, the twelfth positioning surface 321b, and the thirteenth positioning surface 321c are orthogonal to each other. In addition, the corner portion where the eleventh positioning surface 321a and the thirteenth positioning surface 321c come into contact with each other is chamfered. In other words, the fourth positioning portion 321 further includes a third chamfered surface 321d provided at the corner portion where the eleventh positioning surface 321a and the thirteenth positioning surface 321c come into contact with each other.

The fourth fixing portion 322 is a section configured to be used to fix the prism 32 with respect to the see-through mirror 33. The fourth fixing portion 322 is provided, in the XY plane, on the other side of the lateral direction (+Y direction) with respect to the incident surface 22a. In other words, the fourth fixing portion 322 is provided, in the XY plane, on the side opposite to the side on which the fourth positioning portion 321 is provided with respect to the incident surface 22a. The fourth fixing portion 322 is constituted by a corner portion of a plate portion provided on the side opposite to the side on which the fourth positioning portion 321 is provided. The fourth fixing portion 322 includes a fifth abutting surface 322a along the XZ plane and a sixth abutting surface 322b along the XY plane that intersects the fifth abutting surface 322a.

As illustrated in FIG. 14, the see-through mirror 33 includes a see-through mirror main body 330, a third positioning portion 331, and a third fixing portion 332. The see-through mirror main body 330 is a section configured to practically function as a semi-transmissive reflection element and includes a reflection surface 33a.

The third positioning portion 331 is a section for performing positioning of the see-through mirror 33 with respect to the prism 32. The third positioning portion 331 is provided, in a plane intersecting the traveling direction of the imaging light incident on the see-through mirror 33, on an outer side of the reflection surface 33a on which the imaging light is incident. Specifically, the third positioning portion 331 is provided, in the XY plane, on one side in the lateral direction (−X direction) of the reflection surface 33a. The third positioning portion 331 is constituted by a concave portion provided in a support portion 333 that protrudes in the −X direction from the see-through mirror main body 330.

The reflection surface 33a of the present embodiment corresponds to the third optical surface in the claims.

The third positioning portion 331 includes a concave portion that is recessed in a generally cuboid shape, and includes a fourteenth positioning surface 331a along the YZ plane, a fifteenth positioning surface 331b along the XZ plane that intersects the fourteenth positioning surface 331a, and a sixteenth positioning surface 331c along the XY plane that intersects the fourteenth positioning surface 331a and the fifteenth positioning surface 331b. Therefore, the fourteenth positioning surface 331a, the fifteenth positioning surface 331b, and the sixteenth positioning surface 331c are orthogonal to each other. When the see-through mirror 33 and the prism 32 are combined, the fourteenth positioning surface 331a comes into contact with the eleventh positioning surface 321a; the fifteenth positioning surface 331b comes into contact with the twelfth positioning surface 321b; and the sixteenth positioning surface 331c comes into contact with the thirteenth positioning surface 321c.

The third fixing portion 332 is a section configured to be used to secure the see-through mirror 33 with respect to the prism 32. The third fixing portion 332 is provided, in the XY plane, on the other side of the X direction (+X direction), which is the lateral direction with respect to the reflection surface 33a. In other words, the third fixing portion 332 is provided, in the XY plane, on the side opposite to the side on which the third positioning portion 331 is provided with respect to the reflection surface 33a. The third fixing portion 332 includes a concave portion corresponding to the fourth fixing portion 322 of the prism 32, and includes a seventh abutting surface 332a along the XZ plane and an eighth abutting surface 332b along the XY plane that intersects the seventh abutting surface 332a.

In this manner, the see-through mirror 33 is configured as a member in which the see-through mirror main body 330, the third positioning portion 331, and the third fixing portion 332 are integrated by a material such as a resin, for example.

When manufacturing the optical module according to the present embodiment, an assembly of the projection lens 21 and the prism 32 is produced according to the procedure described in the first embodiment; then, after the third positioning portion 331 and the fourth positioning portion 321 are brought into contact with each other to perform positioning between the see-through mirror 33 and the prism 32, the see-through mirror 33 and the prism 32 are joined to each other using an adhesive. In other words, the method of manufacturing an optical module according to the present embodiment includes bringing the third positioning portion 331 and the fourth positioning portion 321 into contact with each other to perform positioning between the see-through mirror 33 and the prism 32; and in a state in which the positioning is performed, joining the see-through mirror 33 and the prism 32 to each other through an adhesive layer.

As illustrated in FIG. 15, when combining the see-through mirror 33 and the prism 32, each positioning surface of the fourth positioning portion 321 of the prism 32 is butted against each positioning surface of the third positioning portion 331 of the see-through mirror 33 such that the eleventh positioning surface 321a of the fourth positioning portion 321 comes into contact with the fourteenth positioning surface 331a of the third positioning portion 331, the twelfth positioning surface 321b of the fourth positioning portion 321 comes into contact with the fifteenth positioning surface 331b of the third positioning portion 331, and the thirteenth positioning surface 321c of the fourth positioning portion 321 comes into contact with the sixteenth positioning surface 331c of the third positioning portion 331. At this time, the fifth abutting surface 322a of the fourth fixing portion 322 comes into contact with the seventh abutting surface 332a of the third fixing portion 332, and the sixth abutting surface 322b of the fourth fixing portion 322 comes into contact with the eighth abutting surface 332b of the third fixing portion 332.

Accordingly, the eleventh positioning surface 321a and the fourteenth positioning surface 331a coming into contact with each other restricts the see-through mirror 33 from relative movement in the −X direction with respect to the prism 32, causing positioning in the X direction to be accomplished. In addition, the twelfth positioning surface 321b and the fifteenth positioning surface 331b coming into contact with each other restricts the see-through mirror 33 from relative movement in the +Y direction with respect to the prism 32, causing positioning in the Y direction to be accomplished. In addition, the thirteenth positioning surface 321c and the sixteenth positioning surface 331c coming into contact with each other restricts the see-through mirror 33 from relative movement in the −Z direction with respect to the prism 32, causing positioning in the Z direction to be accomplished. Note that although positioning between the see-through mirror 33 and the prism 32 in each direction is accomplished at this stage, a part of the concave portion that constitutes the third positioning portion 331 is open. Thus, the see-through mirror 33 is not restricted from relative movement with respect to the prism 32 in the +X direction, the −Y direction, and the +Z direction.

Next, when joining the see-through mirror 33 and the prism 32 to each other, an adhesive is applied to a triangular prism-shaped gap K3 surrounded by the fourteenth positioning surface 331a, the sixteenth positioning surface 331c, and the third chamfered surface 321d, and any location where the third fixing portion 332 and the fourth fixing portion 322 come into contact with each other. Thereafter, the adhesive is cured. Accordingly, the see-through mirror 33 and the prism 32 are fixed to each other. At this stage, the see-through mirror 33 is restricted from relative movement with respect to the prism 32 in the +X direction, the −Y direction, and the +Z direction. Furthermore, the see-through mirror 33 is restricted not only from translation in the above-described directions, but also simultaneously from relative rotation with respect to the prism 32 about the X-axis, about the Y-axis, and about the Z-axis.

In this manner, the optical module according to the present embodiment has a configuration in which, in a state in which positioning between the projection lens 21 and the prism 32 is accomplished by the first positioning portion 211 and the second positioning portion 221 coming into contact with each other, the projection lens 21 and the prism 32 are joined to each other through an adhesive layer; and in a state in which positioning between the see-through mirror 33 and the prism 32 is accomplished by the third positioning portion 331 and the fourth positioning portion 321 coming into contact with each other, the see-through mirror 33 and the prism 32 are joined to each other through an adhesive layer. Accordingly, the projection lens 21, the prism 32, and the see-through mirror 33 are joined in a state in which positioning relative to each other is accomplished.

Note that in the present embodiment, the third fixing portion 332 and the fourth fixing portion 322 are also configured such that surfaces facing each other come into contact with each other. Thus, the third fixing portion 332 and the fourth fixing portion 322 have a positioning function with respect to the Y direction and the Z direction. However, because positioning with respect to all directions is accomplished by the third positioning portion 331 and the fourth positioning portion 321, for the third fixing portion 332 and the fourth fixing portion 322, surfaces facing each other need not necessarily come into contact with each other, and may be separated. However, when surfaces facing each other of the third fixing portion 332 and the fourth fixing portion 322 are configured to come into contact with each other as in the present embodiment, positioning can be more stably performed, and the see-through mirror 33 can be stably supported relative to the prism 32 at a stage before the adhesive cures.

In addition, the optical module according to the present embodiment has a configuration in which the see-through mirror 33 and the prism 32 are joined at both the contact position between the third positioning portion 331 and the fourth positioning portion 321, and the contact position between the third fixing portion 332 and the fourth fixing portion 322. Instead of this configuration, the optical module may have a configuration in which the see-through mirror 33 and the prism 32 are adhered to at either a contact position between the third positioning portion 331 and the fourth positioning portion 321, or a contact position between the third fixing portion 332 and the fourth fixing portion 322. In addition, the eleventh positioning surface 321a and the fourteenth positioning surface 331a, the twelfth positioning surface 321b and the fifteenth positioning surface 331b, and the thirteenth positioning surface 321c and the sixteenth positioning surface 331c, which face each other, need not necessarily be in direct contact, and an adhesive layer may be interposed between positioning surfaces facing each other. Even in this case, taking into consideration the thickness of the adhesive layer in advance enables positioning of the see-through mirror 33 and the prism 32.

Therefore, in the present disclosure, concepts such as "the third positioning portion and the fourth positioning portion coming into contact with each other" in the claims include a case in which they come into contact with each other through an adhesive layer.

In the optical module according to the present embodiment as well, advantages similar to those of the first embodiment are obtained, such as that positioning between optical members can be appropriately performed without increasing the number of parts; that the device can be downsized; that image distortion can be sufficiently corrected; and that display quality can be enhanced.

In particular, in the case of the present embodiment, not only for the relative positioning between the projection lens 21 and the prism 32, but also for the relative positioning between the assembly 35 of the projection lens 21 and the prism 32 and the see-through mirror 33, a positioning structure in which no supporting member is interposed is employed. Accordingly, positioning accuracy between the three optical members can be further enhanced, and distortion correction of the image can be more accurately performed. In addition, the virtual image display device can be further reduced in size and weight.

Third Embodiment

A third embodiment according to the present disclosure will be described below using FIG. 16.

Figure 16:
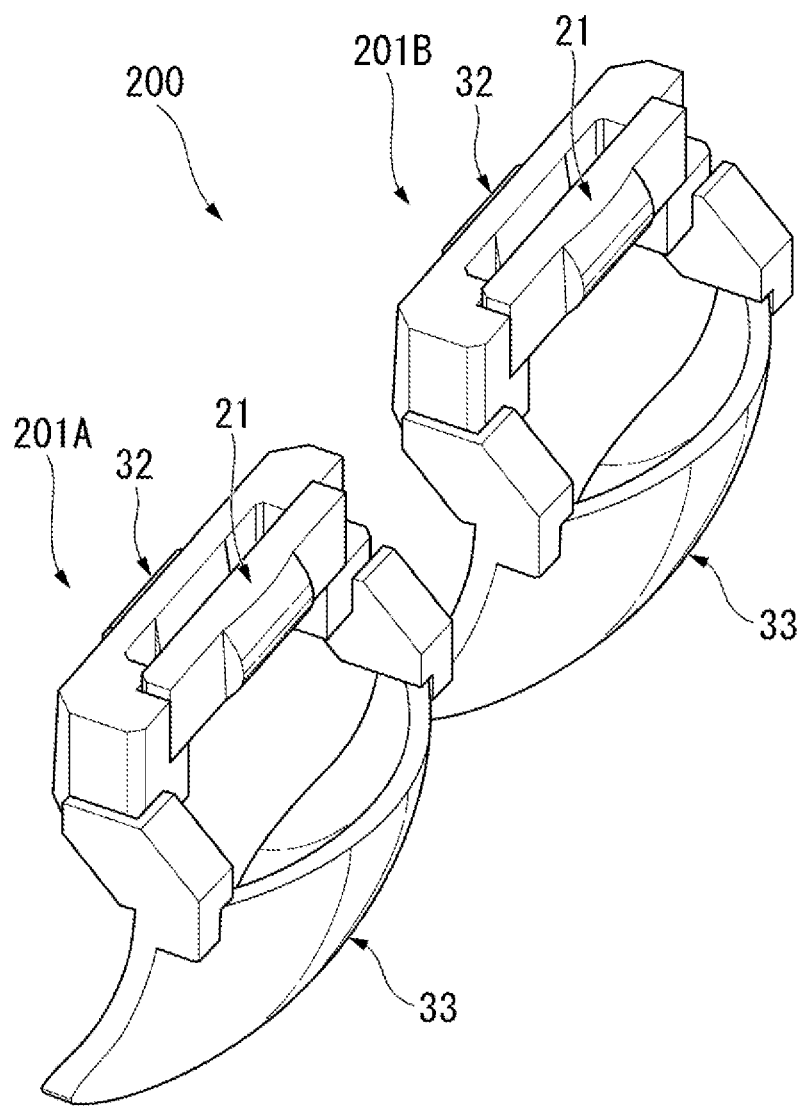
FIG. 16 is a schematic configuration view illustrating a virtual image display device according to a third embodiment.

FIG. 16 is a schematic configuration view of a virtual image display device according to the present embodiment.

In FIG. 16, the components common to those of the drawings of the first embodiment are denoted with the same reference numerals, and the description thereof is omitted.

As illustrated in FIG. 16, a virtual image display device 200 according to the present embodiment includes a first optical module 201A configured to form a virtual image for the right eye, and a second optical module 201B configured to form a virtual image for the left eye. Each of the first optical module 201A and the second optical module 201B is constituted by the optical module according to the second embodiment. Note that each of the first optical module 201A and the second optical module 201B may be constituted by the optical module according to the first embodiment.

The projection lens 21, the prism 32, and the see-through mirror 33 included in the first optical module 201A, and the projection lens 21, the prism 32, and the see-through mirror 33 included in the second optical module 201B are constituted by optical members having the same configuration, respectively.

Since optical members constituting the two optical modules 201A and 201B are constituted by the same optical members, the virtual image display device 200 according to the present embodiment can ensure the same degree of distortion in the virtual image, the same degree of display quality in the virtual image after distortion correction, and the like on the left and on the right, alleviating uncomfortable feeling when viewing the virtual image in both eyes. In addition, the manufacturing cost of the virtual image display device 200 can be reduced.

Note that the technical scope of the present disclosure is not limited to the above-described embodiments, and various modifications can be made to the above-described embodiments without departing from the spirit and gist of the present disclosure.

For example, in the first embodiment, as examples of performing positioning between two optical members among three optical members, an example in which positioning of a projection lens and a prism is carried out is given. However, the present disclosure is not limited to this example. Positioning between a projection lens and a see-through mirror may be carried out, and positioning between a prism and a see-through mirror may be carried out. In addition, in the second embodiment, as an example of performing positioning of three optical members, an example is given in which positioning between a projection lens and a see-through mirror is carried out with a prism serving as a reference. However, the optical member that serves as a reference may be a projection lens or a see-through mirror.

In addition, in the above-described embodiments, a plurality of positioning surfaces constituting positioning portions are orthogonal to each other. However, the plurality of positioning surfaces need not necessarily be orthogonal to each other. For example, adjacent positioning surfaces may form an acute or obtuse angle. In addition, in the above-described embodiments, positioning portions are constituted by a cuboid-shaped convex portion and a concave portion. However, instead of this configuration, a configuration may be adopted in which one of the positioning portions is constituted by a hole, the other positioning portion is constituted by a pin, and fitting the pin into the hole causes positioning of the two optical members to be performed.

In addition, in the above-described embodiments, the projection lens is constituted by a single lens. However, the projection lens may be constituted by a plurality of lenses. In this case, the projection lens may configured such that each of the plurality of lenses includes a positioning portion, is positioned relative to each other, and is also positioned relative to a prism or a see-through mirror.

In addition, in the above-described embodiments, as examples of optical members to be positioned, projection lenses, prisms, and see-through mirrors are given. However, other optical members such as reflective volume holograms, Fresnel lenses, and the like may also be used.

Furthermore, the specific configuration such as the number, arrangement, shape, and material of the various components that constitute optical modules and virtual image display devices is not limited to the above-mentioned embodiments, and may be suitably changed.

In addition, in the above-described embodiments, as an example of a virtual image display device, a head-mounted display is given. However, the present disclosure may be applied to a display shaped so as to be looked into with the device main body being held by hand just like a pair of binoculars, for example, or a so-called handheld display.

An optical module according to an aspect of the present disclosure may have the following configuration.

An optical module according to an aspect of the present disclosure includes: a display element configured to emit imaging light, a first optical member on which the imaging light emitted from the display element is incident, a second optical member on which the imaging light emitted from the first optical member is incident, and a third optical member on which the imaging light emitted from the second optical member is incident, the third optical member forming an exit pupil, wherein a first positioning member constituted by one optical member of at least two optical members among the first optical member, the second optical member, and the third optical member includes a first positioning portion configured to perform positioning with respect to a second positioning member constituted by the other optical member of the at least two optical members, the second positioning member includes a second positioning portion configured to perform positioning with respect to the first positioning member, and in a state in which positioning between the first positioning member and the second positioning member is accomplished by the first positioning portion and the second positioning portion coming into contact with each other, the first positioning member and the second positioning member are joined to each other through an adhesive layer.

In the optical module according to an aspect of the present disclosure, the first positioning portion may be provided, in a plane intersecting a traveling direction of the imaging light in the first positioning member, on an outer side of a first optical surface on which the imaging light is incident; and the second positioning portion may be provided, in a plane intersecting a traveling direction of the imaging light in the second positioning member, on an outer side of a second optical surface on which the imaging light is incident.

In the optical module according to an aspect of the present disclosure, the first positioning portion may be provided on one side in the lateral direction of the first optical surface; and the second positioning portion may be provided on one side in the lateral direction of the second optical surface.

In the optical module according to an aspect of the present disclosure, the first positioning member and the second positioning member may be joined to each other through the adhesive layer on one side in the lateral direction of the first optical surface and the second optical surface.

In the optical module according to an aspect of the present disclosure, the first positioning member and the second positioning member may be joined to each other through the adhesive layer on the other side of the lateral direction with respect to the first optical surface and the second optical surface.

In the optical module according to an aspect of the present disclosure, a third positioning member that is a remaining optical member from the first optical member, the second optical member, and the third optical member with the first positioning member and the second positioning member being excluded therefrom may include a third positioning portion configured to perform positioning with respect to at least one positioning member of the first positioning member and the second positioning member; the at least one positioning member of the first positioning member and the second positioning member may include a fourth positioning portion configured to perform positioning with respect to the third positioning member; and positioning between the at least one positioning member of the first positioning member and the second positioning member and the third positioning member may be accomplished by the third positioning member and the fourth positioning member being into contact with each other.

In the optical module according to an aspect of the present disclosure, the third positioning portion may be provided, in a plane intersecting a traveling direction of the imaging light in the third positioning member, on an outer side of a third optical surface on which the imaging light is incident; the fourth positioning portion may be provided on an outer side of the first optical surface in the first positioning member or on an outer side of the second optical surface in the second positioning member; and the first positioning portion, the second positioning portion, the third positioning portion, and the fourth positioning portion may be provided on one side in a lateral direction of the first optical surface, the second optical surface, or the third optical surface.

In the optical module according to an aspect of the present disclosure, the third positioning portion may be constituted by one of a concave portion and a convex portion, and the fourth positioning portion may be constituted by the other of the concave portion and the convex portion.

In the optical module according to an aspect of the present disclosure, the first positioning portion may be constituted by one of a concave portion and a convex portion, and the second positioning portion may be constituted by the other of the concave portion and the convex portion.

In the optical module according to an aspect of the present disclosure, the first positioning portion may include a first positioning surface, a second positioning surface along a direction intersecting the first positioning surface, and a third positioning surface along a direction intersecting the first positioning surface and the second positioning surface, and the second positioning portion may include a fourth positioning surface coming into contact with the first positioning surface, a fifth positioning surface coming into contact with the second positioning surface, and a sixth positioning surface coming into contact with the third positioning surface.

In the optical module according to an aspect of the present disclosure, the first positioning portion may further include a seventh positioning surface facing one of the first positioning surface, the second positioning surface, and the third positioning surface, and the second positioning portion may further include an eighth positioning surface coming into contact with the seventh positioning surface.

In the optical module according to an aspect of the present disclosure, the first optical member may be a projection lens configured to focus the imaging light emitted from the display element; the second optical member may be a prism configured to cause the imaging light emitted from the projection lens to be incident on an incident surface while being refracted, totally reflected at an inner reflection surface, and emitted from an emitting surface while being refracted; the third optical member may be a see-through mirror configured to reflect the imaging light emitted from the prism toward a pupil position to form the exit pupil; and an image displayed on the display element may include distortion configured to cancel distortion generated by the projection lens, the prism, and the see-through mirror.

A virtual image display device according to an aspect of the present disclosure may have the following configuration.

A virtual image display device according to an aspect of the present disclosure includes the optical module according to an aspect of the present disclosure.

The virtual image display device according to an aspect of the present disclosure may include: a first optical module configured to form a virtual image for a right eye; and a second optical module configured to form a virtual image for a left eye; wherein each of the first optical module and the second optical module may be constituted by the optical module, and the first optical member, the second optical member, the third optical member included in the first optical module, and the first optical member, the second optical member, and the third optical member included in the second optical module may be constituted by members having the same configuration.

A light-guiding device according to an aspect of the present disclosure may have the following configuration.

A light-guiding device according to an aspect of the present disclosure includes: a first optical member on which imaging light is incident; a second optical member on which the imaging light emitted from the first optical member is incident; and a third optical member on which the imaging light emitted from the second optical member is incident, the third optical member forming an exit pupil; wherein a first positioning member constituted by one optical member of at least two optical members among the first optical member, the second optical member, and the third optical member includes a first positioning portion configured to perform positioning with respect to a second positioning member constituted by the other optical member of the at least two optical members; the second positioning member includes a second positioning portion configured to perform positioning with respect to the first positioning member; and in a state in which positioning between the first positioning member and the second positioning member is accomplished by the first positioning portion and the second positioning portion coming into contact with each other, the first positioning member and the second positioning member are joined to each other through an adhesive layer.

A method of manufacturing an optical module according to an aspect of the present disclosure may have the following configuration. A method of manufacturing an optical module according to an aspect of the present disclosure is a method of manufacturing an optical module, the optical module including: a display element configured to emit imaging light; a first optical member on which the imaging light emitted from the display element is incident; a second optical member on which the imaging light emitted from the first optical member is incident; and a third optical member on which the imaging light emitted from the second optical member is incident, the third optical member forming an exit pupil; wherein a first positioning member that is one optical member of at least two optical members among the first optical member, the second optical member, and the third optical member includes a first positioning portion configured to perform positioning with respect to a second positioning member that is the other optical member of the at least two optical members; and the second positioning member includes a second positioning portion configured to perform positioning with respect to the first positioning member; the method including: bringing the first positioning portion and the second positioning portion into contact with each other to perform positioning between the first positioning member and the second positioning member; and in a state in which the positioning is performed, joining the first positioning member and the second positioning member to each other through an adhesive layer.

What is claimed is:

1. An optical module comprising:
a display element configured to emit imaging light;
a first optical member including a first incident surface which the imaging light emitted from the display element is incident and a first emitting surface that emits the imaging light;
a second optical member including a second incident surface which the imaging light emitted from the emitting surface of the first optical member is directly incident, a second emitting surface that emits the imaging light, and a reflecting surface that reflects the imaging light to the second emitting surface from the second incident surface;
a third optical member on which the imaging light emitted from the second emitting surface of the second optical member is incident, the third optical member forming an exit pupil; and
an adhesive that joints the first optical member and the second optical member, wherein
the first optical member includes a first positioning portion that includes a first positioning surface, a second positioning surface, and a third positioning surface, the first positioning surface extending along a first direction and a second direction intersecting with the first direction, the second positioning surface extending along the second direction and a third direction intersecting with the first direction and the second direction, and the third positioning surface extending along the first direction and the third direction,
the first positioning portion is outer than the first incident surface and the first emitting surface in the first optical member,
the second optical member includes a second positioning portion that includes a fourth positioning surface, a fifth positioning surface, and a sixth positioning surface, the fourth positioning surface contacting with the first positioning surface of the first positioning portion of the first optical member, the fifth positioning surface contacting with the second positioning surface of the first positioning portion, of the first optical member and the sixth positioning surface contacting with the third positioning surface of the first positioning portion of the first optical member,
the second positioning portion is outer than the second incident surface, the second emitting surface, and the reflecting surface in the second optical member,
the first optical member includes a first fixing portion being opposite to the first positioning portion in the first optical member,
the first fixing portion of the first optical member includes a first abutting surface and a second abutting surface, the first abutting surface extending along the second direction and the third direction, and the second abutting surface extending along the first direction and the third direction,
the second optical member includes a second fixing portion being opposite to the second positioning portion in the second optical member,
the second fixing portion of the first optical member includes a third abutting surface and a fourth abutting surface, the third abutting surface contacting with the first abutting surface of the first fixing portion of the first optical member, and the fourth abutting surface contacting with the second abutting surface of the first fixing portion of the first optical member,
the first positioning portion includes a first portion that is in indirect contact with the second positioning portion via the adhesive, and a second portion that is in direct contact with the second positioning portion without the adhesive therebetween, and
the second fixing portion of the second optical member does not include a surface that is contacted with a surface of the first fixing portion of the first optical member extending along the first direction and the second direction.

2. The optical module according to claim 1, wherein the second positioning surface of the first positioning portion of the first optical member contacts with the fifth positioning surface of the second positioning portion of the second optical member via the adhesive.

3. The optical module according to claim 1, wherein the first positioning surface of the first positioning portion of the first optical member contacts with the fourth positioning surface of the second positioning portion of the second optical member via the adhesive.

4. The optical module according to claim 1, wherein
a third optical member includes a third positioning portion including a fourteenth positioning surface, a fifteenth positioning surface, and a sixteenth positioning surface, the fourteenth positioning surface extending along the first direction and the second direction, the fifteenth positioning surface extending along the second direction and the third direction, and the sixteenth positioning surface extending along the first direction and the third direction,
the second optical member includes a fourth positioning portion including an eleventh positioning surface, a twelfth positioning surface, and thirteenth positioning surface, the eleventh positioning surface contacting with the fourteenth positioning surface of the third positioning portion of the third optical member, the twelfth positioning surface contacting with the fifteenth positioning surface of the third positioning portion of the third optical member, and the thirteenth positioning surface contacting with the sixteenth positioning surface of the third positioning portion of the third optical member,
the second optical member includes a fourth fixing portion being opposite to the fourth positioning portion in the third optical member,
the fourth fixing portion of the second optical member includes a fifth abutting surface and a sixth abutting surface, the fifth abutting surface extending along the second direction and the third direction, and the sixth abutting surface extending along the first direction and the third direction,
the third optical member includes a third fixing portion being opposite to the third positioning portion in the third optical member,
the third fixing portion of the third optical member includes a seventh abutting surface and an eighth abutting surface, the seventh abutting surface contacting with the fifth abutting surface of the fourth fixing portion of the second optical member, and the eighth abutting surface contacting with the sixth abutting surface of the fourth fixing portion of the second optical member, and
the third fixing portion of the third optical member does not include a surface that is contacted with a surface of the fourth fixing portion of the second optical member extending along the first direction and the second direction.

5. The optical module according to claim 4, wherein
the third positioning portion is provided, in a plane intersecting a traveling direction of the imaging light in the third optical member, on an outer side of a third optical surface on which the imaging light is incident,
the fourth positioning portion is provided on an outer side of the second optical surface in the second optical member, and
the first positioning portion, the second positioning portion, the third positioning portion, and the fourth positioning portion are provided on one side in a lateral direction of the first optical surface, the second optical surface, or the third optical surface.

6. The optical module according to claim 4, wherein
the third positioning portion is constituted by one of a concave portion and a convex portion and
the fourth positioning portion is constituted by the other of the concave portion and the convex portion.

7. The optical module according to claim 1, wherein
the first positioning portion is constituted by one of a concave portion and a convex portion and
the second positioning portion is constituted by the other of the concave portion and the convex portion.

8. The optical module according to claim 1, wherein
the first optical member focuses the imaging light emitted from the display element,
the second optical member causes the imaging light emitted from the first optical member to be incident on an incident surface while being refracted, totally reflected at an inner reflection surface, and emitted from an emitting surface while being refracted,
the third optical member reflects the imaging light emitted from the second optical member toward a pupil position to form the exit pupil, and
an image displayed on the display element includes distortion configured to cancel distortion generated by the first optical member, the second optical member, and the third optical member.

9. A virtual image display device comprising the optical module according to claim 1.

10. The virtual image display device according to claim 9, further comprising:
a first optical module configured to form a virtual image for a right eye; and
a second optical module configured to form a virtual image for a left eye; wherein
each of the first optical module and the second optical module is constituted by the optical module and
the first optical member, the second optical member, and the third optical member included in the first optical module, and the first optical member, the second optical member, and the third optical member included in the second optical module are constituted by members having a same configuration.

11. A light-guiding device comprising:
a first optical member including a first incident surface on which imaging light is incident and a first emitting surface that emits the imaging light;
a second optical member including a second incident surface on which the imaging light emitted from the emitting surface of the first optical member is directly incident, a second emitting surface that emits the imaging light, and a reflecting surface that reflects the imaging light to the second emitting surface from the second incident surface;
a third optical member on which the imaging light emitted from the second emitting surface of the second optical member is incident, the third optical member forming an exit pupil; and
an adhesive that joints the first optical member and the second optical member, wherein
the first optical member includes a first positioning portion that includes a first positioning surface, a second positioning surface, and a third positioning surface, the first positioning surface extending along a first direction and a second direction intersecting with the first direction, the second positioning surface extending along the second direction and a third direction intersecting with the first direction and the second direction, and the third positioning surface extending along the first direction and the third direction,
the first positioning portion is outer than the first incident surface and the first emitting surface in the first optical member,
the second optical member includes a second positioning portion that includes a fourth positioning surface, a fifth positioning surface, and a sixth positioning surface, the fourth positioning surface contacting with the first positioning surface of the first positioning portion of the first optical member, the fifth positioning surface contacting with the second positioning surface of the first positioning portion, of the first optical member and the sixth positioning surface contacting with the third positioning surface of the first positioning portion of the first optical member,
the second positioning portion is outer than the second incident surface, the second emitting surface, and the reflecting surface in the second optical member,
the first optical member includes a first fixing portion being opposite to the first positioning portion in the first optical member,
the first fixing portion of the first optical member includes a first abutting surface and a second abutting surface, the first abutting surface extending along the second direction and the third direction, and the second abutting surface extending along the first direction and the third direction,
the second optical member includes a second fixing portion being opposite to the second positioning portion in the second optical member,
the second fixing portion of the first optical member includes a third abutting surface and a fourth abutting surface, the third abutting surface contacting with the first abutting surface of the first fixing portion of the first optical member, and the fourth abutting surface contacting with the second abutting surface of the first fixing portion of the first optical member,
the first positioning portion includes a first portion that is in indirect contact with the second positioning portion via the adhesive, and a second portion that is in direct contact with the second positioning portion without the adhesive therebetween, and
the second fixing portion of the second optical member does not include a surface that is contacted with a surface of the first fixing portion of the first optical member extending along the first direction and the second direction.

* * * * *